(12) United States Patent
Cibulka et al.

(10) Patent No.: US 12,498,134 B2
(45) Date of Patent: *Dec. 16, 2025

(54) WIRELESSLY CONFIGURING CLIMATE CONTROL SYSTEM CONTROLS

(71) Applicant: Emerson Electric Co., St. Louis, MO (US)

(72) Inventors: Austin John Cibulka, St. Louis, MO (US); Nayan Jyoti Mishra, Richmond Heights, MO (US); David L. Vie, Union, MO (US); Michael J. Moran, St. Louis, MO (US); John F. Broker, Warrenton, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 630 days.

This patent is subject to a terminal disclaimer.

(21) Appl. No.: 17/947,807

(22) Filed: Sep. 19, 2022

(65) Prior Publication Data

US 2023/0011855 A1 Jan. 12, 2023

Related U.S. Application Data

(63) Continuation-in-part of application No. 17/730,818, filed on Apr. 27, 2022, now Pat. No. 12,422,157,
(Continued)

(51) Int. Cl.
*G05B 19/042* (2006.01)
*F24F 11/56* (2018.01)
*F24F 11/63* (2018.01)

(52) U.S. Cl.
CPC ............. *F24F 11/63* (2018.01); *F24F 11/56* (2018.01)

(58) Field of Classification Search
CPC .......... F24F 11/63; F24F 11/56; F24F 11/523; F24F 11/58; F24F 11/64; F24F 11/52;
(Continued)

(56) References Cited

U.S. PATENT DOCUMENTS 4,336,902 A 6/1982 Neal
4,373,662 A 2/1983 Bassett et al.
(Continued)

FOREIGN PATENT DOCUMENTS

EP 0050287 A2 4/1982

OTHER PUBLICATIONS

U.S. Appl. No. 17/730,818, filed Apr. 27, 2022.
(Continued)

*Primary Examiner* — Santosh R Poudel
(74) *Attorney, Agent, or Firm* — Harness, Dickey & Pierce, P.L.C.; Anthony G. Fussner

(57) ABSTRACT

In an exemplary system embodiment, a mobile device is configured to receive and/or determine a first identifier of the first HVAC control and to automatically configure one or more first settings for the first HVAC control corresponding with the first identifier. The one or more first settings are stored within and retrievable directly from the memory of the mobile device. The mobile device is also configured to receive and/or determine a second identifier of the second HVAC control and to automatically configure one or more second settings for the second HVAC control corresponding with the second identifier. The one or more second settings are stored within and retrievable directly from the memory of the mobile device for wireless transmission to the second HVAC control for download to a memory of the second HVAC control for controlling at least one HVAC component according to the one or more second settings.

20 Claims, 23 Drawing Sheets

Related U.S. Application Data which is a continuation-in-part of application No. 17/517,391, filed on Nov. 2, 2021, now Pat. No. 11,725,840, which is a continuation-in-part of application No. 16/008,817, filed on Jun. 14, 2018, now Pat. No. 11,193,682.

(60) Provisional application No. 62/520,771, filed on Jun. 16, 2017.

(58) Field of Classification Search
CPC .......... G05B 2219/2614; G05B 19/042; H04L 12/282; H04L 41/22; H04L 2012/2841; H04L 41/0806; H04L 67/12; H04L 67/125; H04M 1/72415; H04M 1/72412; H04W 4/33; H04W 4/80; H04W 4/50
See application file for complete search history.

(56) References Cited

U.S. PATENT DOCUMENTS

| | | | |
|---|---|---|---|
| 4,421,268 A | 12/1983 | Bassett et al. | |
| 5,544,645 A | 8/1996 | Armijo et al. | |
| 5,822,740 A | 10/1998 | Haissig et al. | |
| 6,739,145 B2 | 5/2004 | Bhatnagar | |
| 6,851,621 B1 | 2/2005 | Wacker | |
| 7,055,759 B2 | 6/2006 | Wacker et al. | |
| 7,513,438 B2 | 4/2009 | Mueller | |
| 7,575,179 B2 | 8/2009 | Morrow et al. | |
| 8,074,892 B2 | 12/2011 | Bracken et al. | |
| 8,078,326 B2 | 12/2011 | Harrod et al. | |
| 8,621,377 B2 | 12/2013 | D'Souza et al. | |
| 8,917,045 B2 | 12/2014 | Durfee et al. | |
| 9,412,328 B2 | 8/2016 | Vie et al. | |
| 9,491,242 B2 | 11/2016 | Bomkamp et al. | |
| 9,689,569 B2 | 6/2017 | Vie | |
| 10,174,967 B2 | 1/2019 | Schneider et al. | |
| 10,317,867 B2 * | 6/2019 | Moore | F24F 11/58 |
| 11,725,840 B2 | 8/2023 | Vie et al. | |
| 2004/0118932 A1 | 6/2004 | Sanchez | |
| 2007/0114291 A1 * | 5/2007 | Pouchak | G05D 23/1905 236/44 C |
| 2009/0287355 A1 | 11/2009 | Milder et al. | |
| 2010/0017753 A1 * | 1/2010 | Li | H04M 1/72436 715/810 |
| 2010/0075264 A1 | 3/2010 | Kaplan et al. | |
| 2012/0124799 A1 | 5/2012 | Addy | |
| 2012/0221150 A1 | 8/2012 | Arensmeier | |
| 2012/0232969 A1 | 9/2012 | Fadell et al. | |
| 2013/0158720 A1 | 6/2013 | Zywicki et al. | |
| 2014/0156087 A1 | 6/2014 | Amundson | |
| 2014/0191848 A1 * | 7/2014 | Imes | H04B 5/77 340/10.5 |
| 2014/0350733 A1 | 11/2014 | Lorenz et al. | |
| 2015/0017913 A1 | 1/2015 | Kuroyama et al. | |
| 2015/0032264 A1 | 1/2015 | Emmons et al. | |
| 2015/0053780 A1 | 2/2015 | Nelson et al. | |
| 2015/0148963 A1 | 5/2015 | Klein et al. | |
| 2015/0184924 A1 | 7/2015 | Vie et al. | |
| 2015/0185724 A1 * | 7/2015 | Noguchi | G05B 19/042 700/86 |
| 2015/0204569 A1 * | 7/2015 | Lorenz | F24F 11/62 700/278 |
| 2016/0123588 A1 | 5/2016 | Vie | |
| 2016/0147211 A1 | 5/2016 | Kore et al. | |
| 2017/0156076 A1 * | 6/2017 | Eom | H04W 24/10 |
| 2017/0181254 A1 | 6/2017 | Meitl et al. | |
| 2017/0211836 A1 | 7/2017 | Perez et al. | |
| 2017/0321898 A1 | 11/2017 | Randell | |
| 2017/0364106 A1 | 12/2017 | Smith et al. | |
| 2018/0074471 A1 | 3/2018 | Poplawski et al. | |
| 2018/0080669 A1 * | 3/2018 | Corcoran | F24F 11/62 |
| 2018/0363934 A1 | 12/2018 | Vie et al. | |
| 2019/0223248 A1 * | 7/2019 | Chandran | H04L 12/2803 |
| 2021/0325050 A1 | 10/2021 | Vie | |
| 2022/0034536 A1 | 2/2022 | Broker et al. | |
| 2022/0034537 A1 | 2/2022 | Broker et al. | |
| 2022/0057097 A1 | 2/2022 | Vie et al. | |

OTHER PUBLICATIONS

U.S. Appl. No. 17/517,391, filed Nov. 2, 2021.
U.S. Appl. No. 16/008,817, filed Jun. 14, 2018.
White-Rodgers Connect; Work Smart; White-Rodgers.com; Copyright 2023; 7 pages.
White-Rodgers; 50E47U-843 Non-Integrated Hot Surface Ignition (HSI) Module Installation Instructions; white-rodgers.com; accessed Aug. 9, 2023; 8 pages.
Single Stage HSI Integrated Furnace Control for PSC & ECMx Blower Motors 50M56X-843; Emerson.com/White-Rodgers; Copyright 2022; 2 pages.
All-Spark™ Intermittent Pilot/Direct Spark Ignition Module; White-Rodgers; Emerson.com/White-Rodgers; Copyright 2022; 12 pages.
All-Spark™ Intermittent Pilot / Direct Spark Ignition MOdule; 50D50U-843; Emerson.com/White-rodgers; Copyright 2022; 2 pages.
50M56X-843 Universal Integrated Single Stage 120V Hot Surface Ignition Control Kit; Installation Instructions; emerson.com/white-rodgers; Copyright 2022; 12 pages.
50D50U-843 All-Spark™ 24v Non-Integrated Spark Ignition Module; Installation Instructions; Copyright 2021; emerson.com/white-rodgers; 8 pages.

* cited by examiner

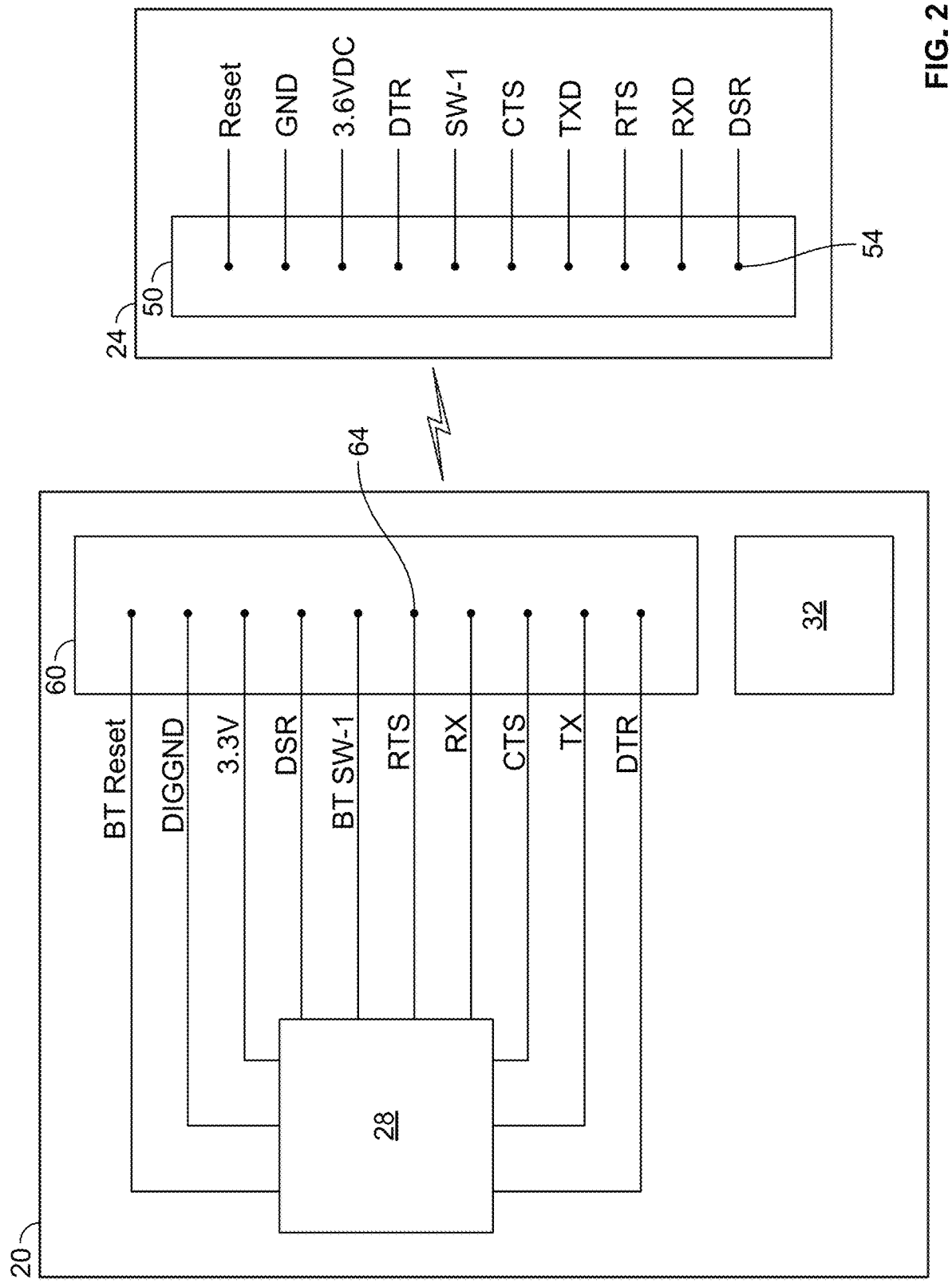

| OEM | Defrost Type | Defrost Cycle Time | Short Cycle Time | RV Power | RV Shift Delay | Max Defrost Time | Defrost Enable Coil Temp | Defrost Terminate Coil Temp |
|---|---|---|---|---|---|---|---|---|
| C nnnn | T/T | 90 min | 5 min | 0 | 0 sec | 10 min | 30° | 65° |
| G bbbb | T/T | 80 min | 5 min | 0 | 30 sec | 10 min | 35° | 70° |
| Lxxxx | Demand | n/a | 5 min | 0 | 30 sec | 14 min | 35° | 50° |
| Tyyyy | Demand | n/a | 0 min | 0 | 12 sec | 14 min | 35° | 50° |
| Rzzzz | Demand | n/a | 5 min | 8 | 30 sec | 14 min | 35° | 70° |
| Ykkkk | Demand | n/a | 5 min | 0 | 30 sec | 8 min | 31° | 80° |
| Nmmmm | Demand | n/a | 3 min | 0 | 30 sec | 14 min | 35° | 70° |
| Factory Default | Demand | n/a | 5 min | 0 | 30 sec | 14 min | 35° | 70° |

FIG. 3

| Set-Up Feature | Set-Up Details | |
|---|---|---|
| Display Orientation | Rotates the Display for Easy Viewing | |
| Error | Displays Current System Errors. | |
| Fault Recall | Displays Stored System Errors. | |
| Quick Set up by OEM | Selects | |
| | Cnnnn (1) | Rzzzz (5) |
| | Gbbbb (2) | Ykkkk (6) |
| | Lxxxx (3) | Nmmmm (7) |
| | Tyyyy (4) | Default (8) |
| Defrost Type | Selects Demand Defrost or Timed Temperature Defrost. | |
| Enable Temperature | Selects Coil Temperature (degrees F) Allowing Timed / Temperature or Demand Defrost to Accumulate Run Time. Above this Temperature a Defrost Cycle will not Occur. | |
| Termination Temperature | Selects Desired Coil Temperature to Terminate Defrost Cycle (degrees F) | |
| Defrost Cycle Time (Timed / Temp Defrost only) | Selects Accumulated Compressor Run Time (minutes) before Entering Defrost Mode. (Appears for Timed Temperature Defrost Systems Only). | |
| Short Cycle Time | Selects Minimum Time Delay (minutes) between Cycles. | |
| Reversing Valve Power | "O" Selection Energizes Reversing Valve in Cool, "B" Energizes Reversing Valve in Heat (B). | |
| Reversing Valve Shift Delay Time | Selection Limits Excessive Noise In and Out of a Defrost Cycle (in seconds). | |

FIG. 4A

| Set-Up Feature | Set-Up Details |
|---|---|
| Maximum Defrost Time | Selection Limits Maximum Defrost Time (Minutes) |
| Auxiliary Heat Lockout | Settings Allow the Control to Act as an Outdoor Thermostat to Prevent Auxiliary Heat from Coming on Until the Outdoor Temperature Drops to the Selected Temperature (Degrees F). |
| Low Temp Compressor Cutout | Settings Allow the Control to Act as an Outdoor Thermostat to Turn off the Heat Pump and Use Only Auxiliary Heat when it's Too Cold for the Pump to Operate Efficiently (Degrees F). |
| Brownout Random Time Start Delay | "On" Selects a 5 to 90 Second Random Time Start Delay After a Brownout |
| Low Pressure Switch | Accommodates Systems with or without a Low Pressure Switch - if the System Does not Have a Low Pressure Switch to "off" |
| High Pressure Switch | Accommodates Systems with or without a High Pressure Switch - if the System Does not Have a High Pressure Switch to "off" |
| 24V Brownout Protection | "On" Turns Off the Compressor and Fan if Low Voltage Drops Below 15.5VAC. |

FIG. 4B

| | 13:52 | ⏰ ✱ 42% 🔋 |
|---|---|---|
| 📶 | Settings<br>Connected | |

SYSTEM SETTINGS

| | |
|---|---|
| Defrost Type | Demand › |
| Reversing Valve Power | 0 › |
| Random Start Delay Time | ⚪ |
| Low Pressure Switch | ⚪ |
| High Pressure Switch | ⚪ |
| 24V Brownout Protection | ⚪ |

TEMPERATURE SETTINGS

| | |
|---|---|
| Enable Temperature | 35 F › |
| Termination Temperature | 70 F › |
| Supplemental Heat Lockout | Off › |
| Low Temp Compressor Cutout | Off › |

TIME SETTINGS

| | |
|---|---|
| Defrost Cycle Time | N/A |
| Short Cycle Time | 5 Min › |
| Reversing Valve Shift Delay | 30 Sec › |
| Maximum Defrost Cycle | 14 Min › |

SPECIAL SETTINGS

| | |
|---|---|
| Display Orientation | Hi › |

Configure

FIG. 5A

WIRELESSLY CONFIGURING CLIMATE CONTROL SYSTEM CONTROLS

CROSS-REFERENCE TO RELATED APPLICATIONS

This application is a continuation-in-part of U.S. patent application Ser. No. 17/517,391 filed Nov. 2, 2021 (published as US2022/0057097 on Feb. 24, 2022).

This application is also continuation-in-part of U.S. patent application Ser. No. 17/730,818 filed Apr. 27, 2022 (published as US2022/0252292 on Aug. 11, 2022), which, in turn, was a continuation-in-part of U.S. patent application Ser. No. 17/517,391.

U.S. patent application Ser. No. 17/517,391 is a continuation-in-part of U.S. patent application Ser. No. 16/008,817 filed Jun. 14, 2018 (published as US2018/0363934 on Dec. 20, 2018 and issued as U.S. Pat. No. 11,193,682 on Dec. 7, 2022).

U.S. patent application Ser. No. 16/008,817 claims the benefit and priority of U.S. Provisional Application No. 62/520,771 filed Jun. 16, 2017.

The entire disclosures of the above applications are incorporated herein by reference.

FIELD

The present disclosure generally relates to wirelessly configuring climate control system controls.

BACKGROUND

This section provides background information related to the present disclosure which is not necessarily prior art.

The operational parameters of a heating, ventilation and air conditioning (HVAC) component (e.g., furnace, air conditioner, heat pump, etc.) may be set by using an HVAC control or controller. In setting the operational parameters, a contractor, installer, or original equipment manufacturer may refer to a display that indicates, e.g., status and fault information.

DRAWINGS

The drawings described herein are for illustrative purposes only of selected embodiments and not all possible implementations and are not intended to limit the scope of the present disclosure.

FIG. 2 is a diagram of selected components of a universal heat pump defrost control and a mobile device, each configured in accordance with one example embodiment of the disclosure;

FIG. 3 is an example table of original equipment manufacturers (OEMs) of defrost controls and corresponding defrost control parameters for each OEM;

Figure 5B:
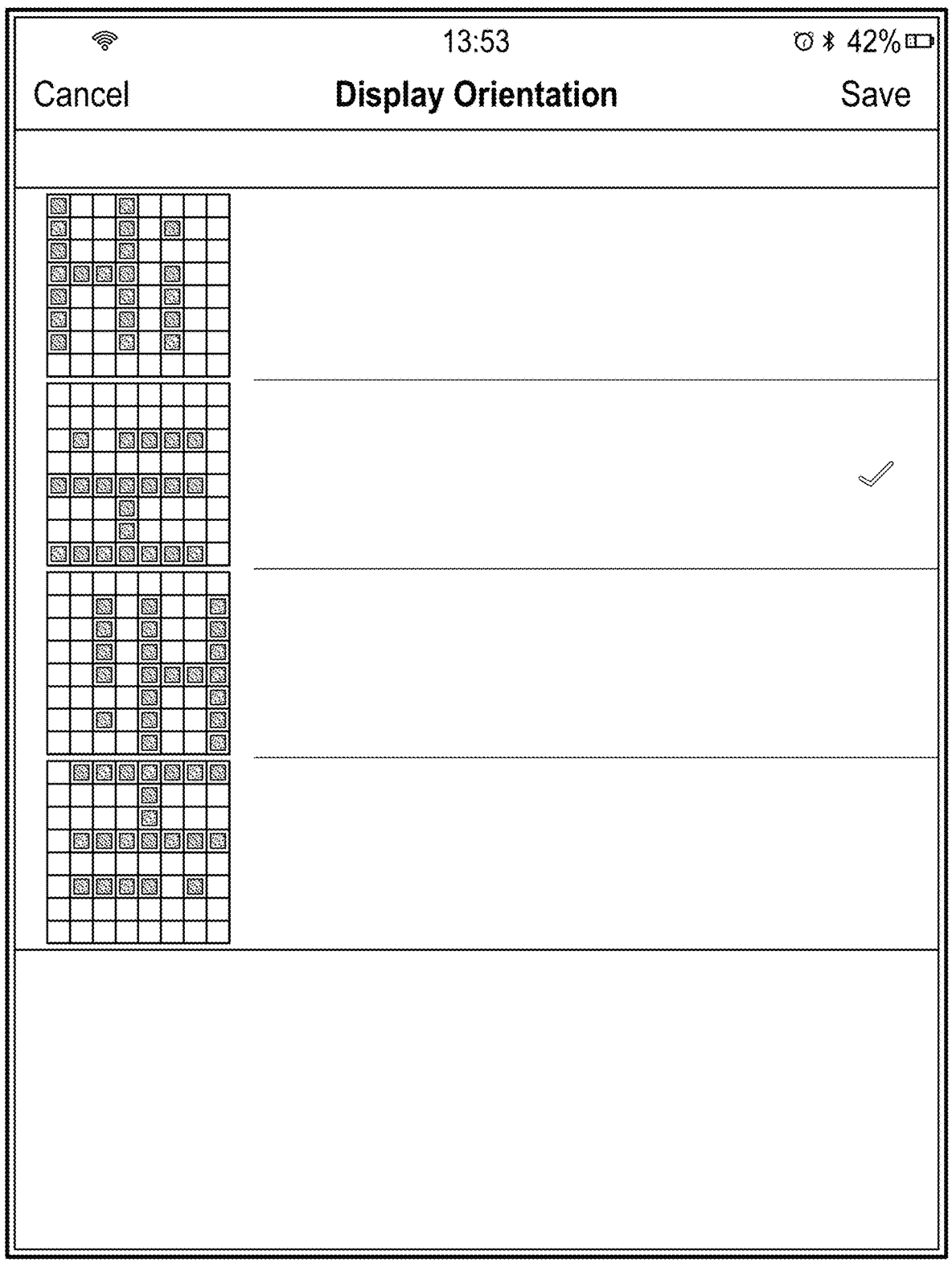
Figure 5C:
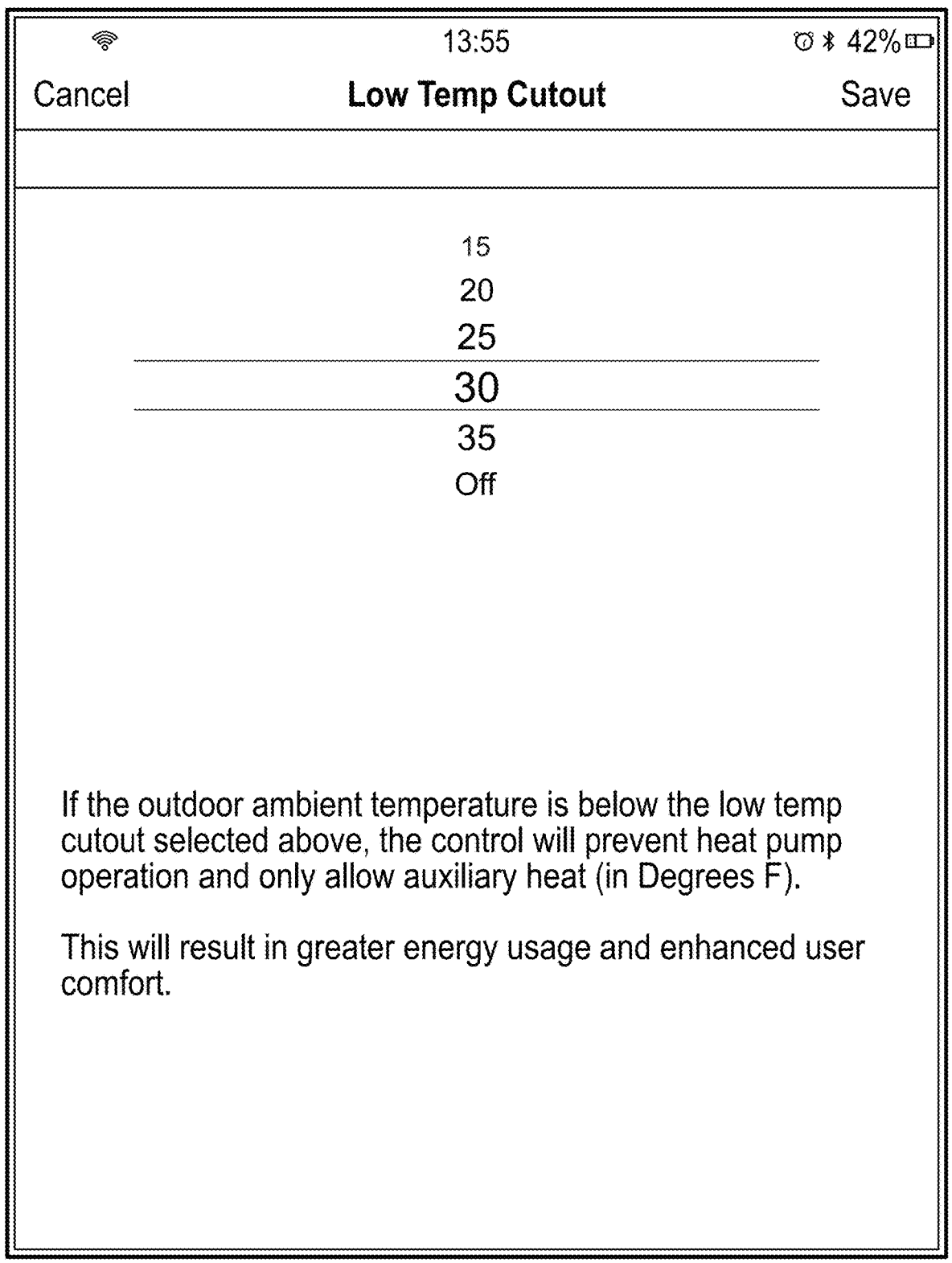
Figure 5D:
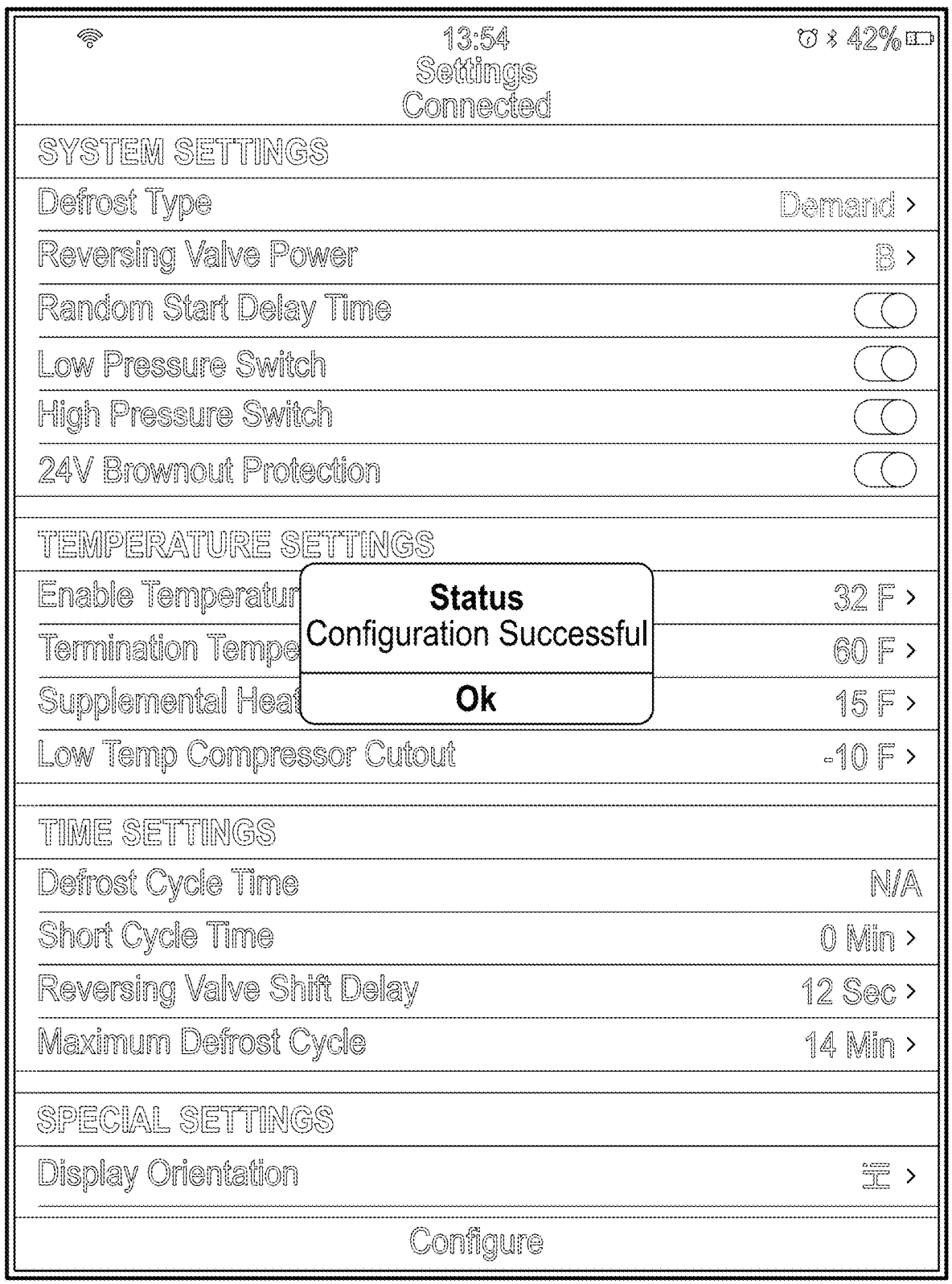
Figure 6:
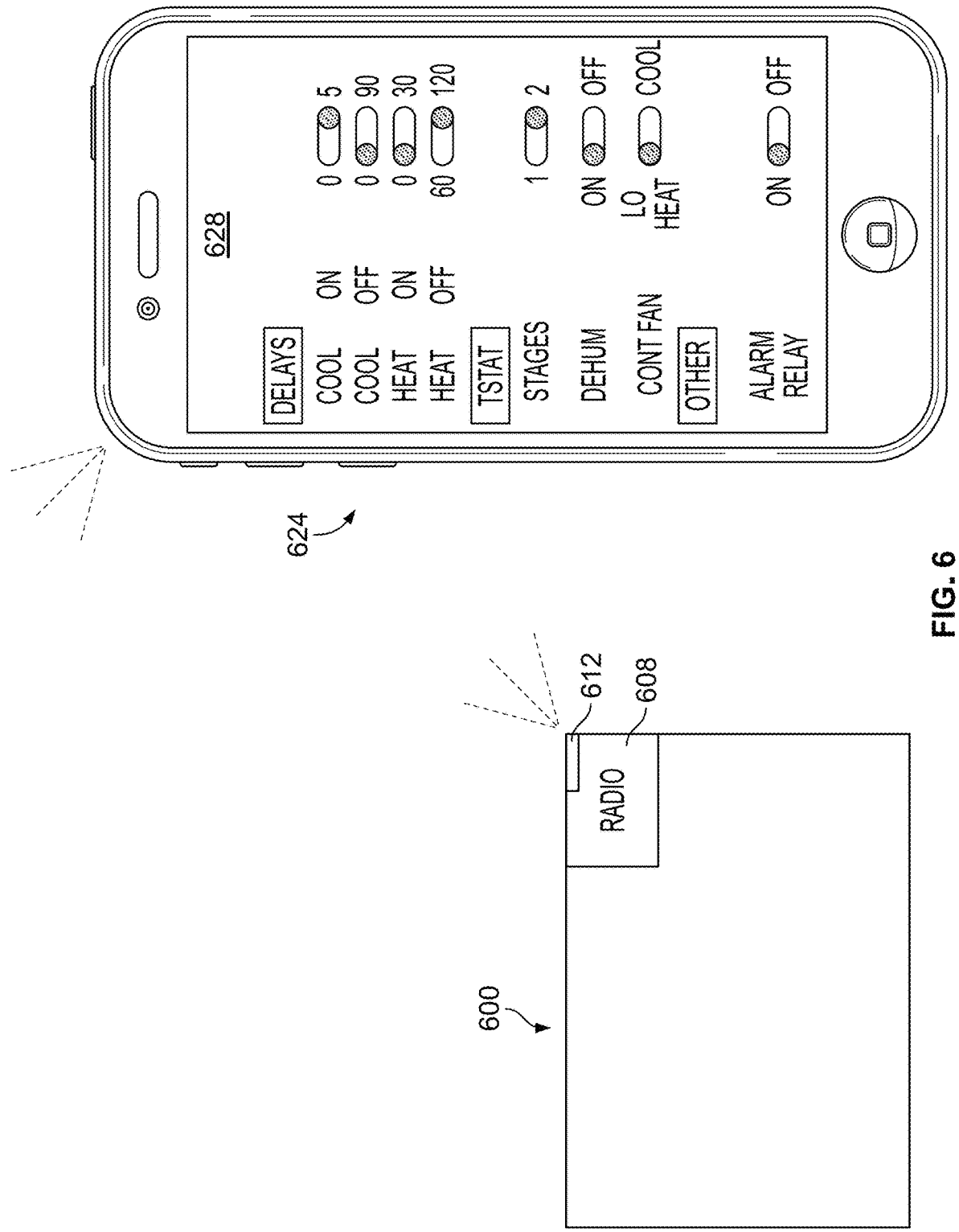
Figure 7:
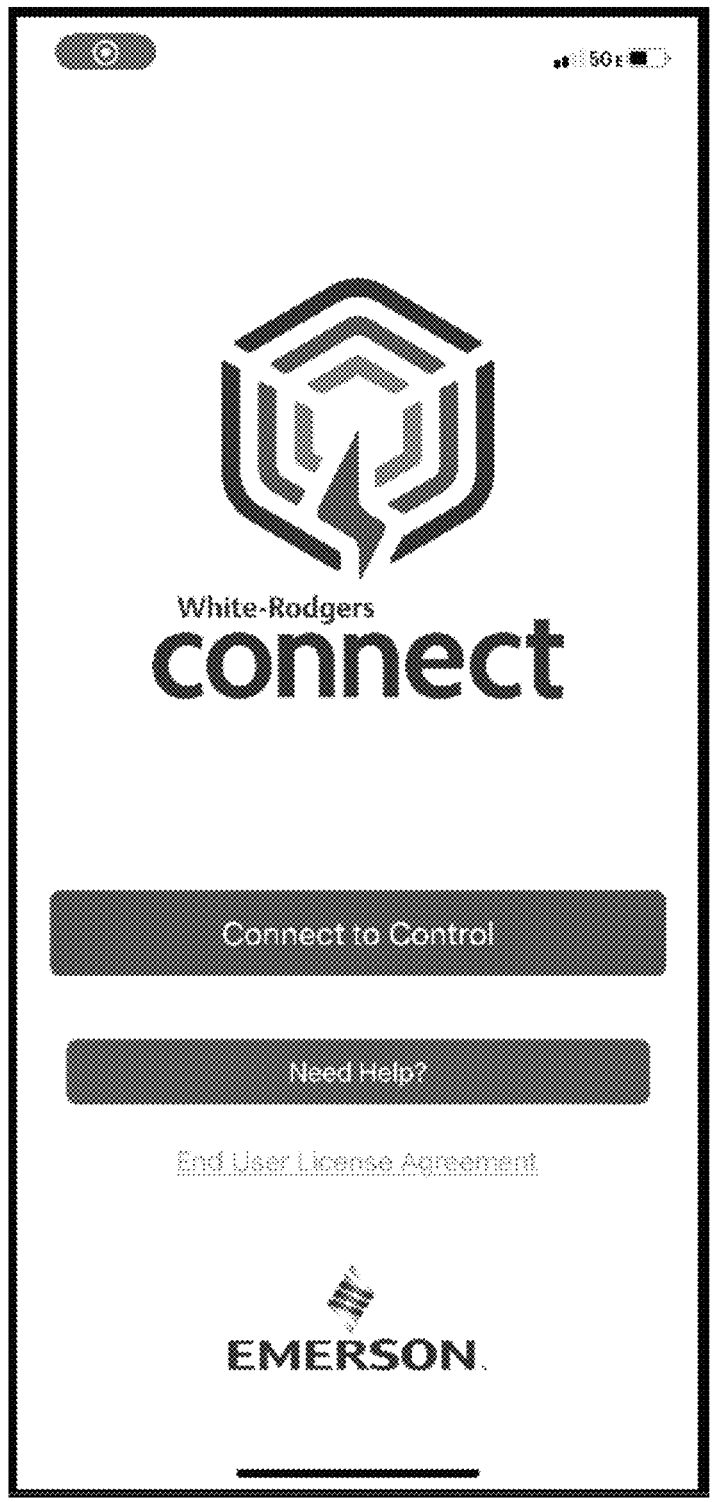
Figure 8:
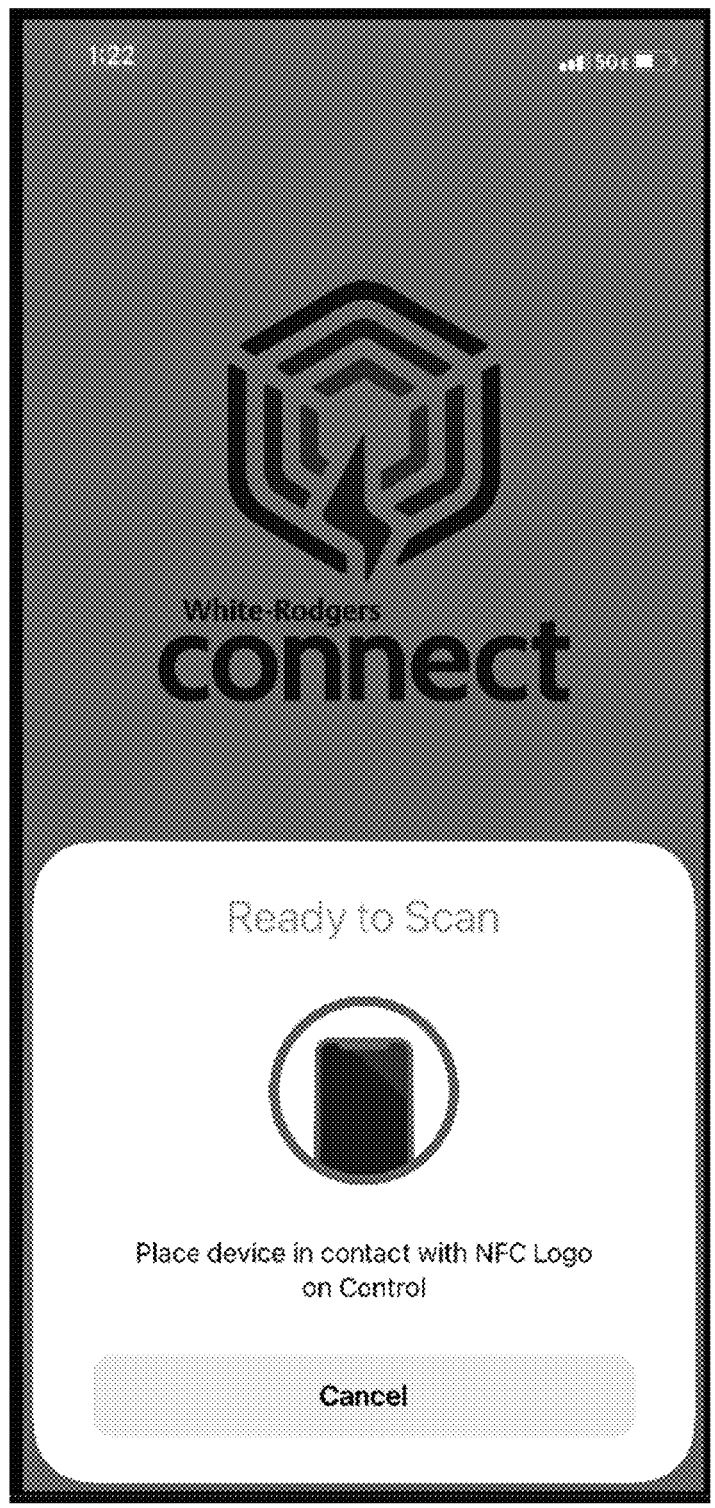

FIGS. 4A and 4B describe example defrost control set-up features that may be provided wirelessly to a mobile device as menu choices in accordance with various implementations of the disclosure;

FIGS. 5A, 5B, 5C, and 5D are screenshots of selectable menu items and information displayed in accordance with one example embodiment of the disclosure; and FIG. 6 is a diagram of an example integrated furnace control (IFC) and a user mobile device configured to provide setup parameters to the IFC in accordance with an example implementation of the disclosure; and FIGS. 7 through 19 are screenshots that may be displayed while using a software application (an App) on a mobile device to configure an HVAC control (which may be new or a replacement HVAC control) in accordance with one example embodiment of the disclosure.

Corresponding reference numerals indicate corresponding (although not necessarily identical) parts throughout the several views of the drawings.

DETAILED DESCRIPTION

Example embodiments will now be described more fully with reference to the accompanying drawings.

The inventors hereof have recognized that control boards for HVAC controls for HVAC equipment, units, systems, etc., including but not limited to furnaces, heat pumps and air handlers, are becoming increasingly complex. Conventional furnace, heat pump and air handler units typically have to be opened up in order to access control boards, to access fault and/or operational data, and/or to change configuration settings. It can be difficult for a service technician or other user to configure HVAC controls via dipswitches, push buttons and/or LEDs, which can be difficult for the user to read, understand and execute correctly, particularly in dark and confined spaces that can be very hot or very cold. Blinking LED fault codes can be misread and misinterpreted.

Further, for units in need of replacement HVAC controls, it often can be difficult to configure a replacement for a control that has a large number of options. A large number of possible options also can make it difficult to provide a universal control for such units. Many conventional interfaces for installing replacement HVAC controls require an installer to understand the settings of an old control and to manually set them for a replacement control.

Accordingly, the inventors have developed and disclose herein exemplary embodiments of an HVAC control having a power supply and a short-range wireless communication interface (e.g., BLUETOOTH (BT), Near Field Communication (NFC), etc.) or other radio communication interface, which may be integrated into a circuit board of the control. In various embodiments, an installer may use a software application on a smartphone or other mobile computing device to configure such a control. In some embodiments, the HVAC control radio communication interface is connectable with a BT or other radio communication interface of an installer's mobile device.

A series of menu items may be provided to the installer, who may follow the menu items to install the HVAC control. In various embodiments, a software application menu may list a plurality of HVAC control types that could be configured using the software application, and a user may select from the menu a type of control to configure.

Additionally, or alternatively, when a software application on a user's mobile device has been connected with a control via BT or other radio communication interface, the software application may query the HVAC control as to its type and thereafter automatically present the appropriate control configuration menu to the user on the mobile device. In embodiments in which a control is to be configured as a replacement for an existing control, a software application on a user mobile device may query the existing control to extract its programmable parameters, pre-populate selection criteria in the application with the extracted parameters, and download the selections to the replacement control.

In some embodiments, a user may enter, e.g., by typing and/or by voice command, a type and number for a particular HVAC control (which may be new or a replacement) into a software application on the user's mobile device, after which the application contacts a remote server to obtain parameter selection criteria for the user-identified control. The server may fetch the parameter selection information from a database and send the values to the application for download to the control.

Thus, in various embodiments, all configurable parameters may be automatically selected, and in the case of a new control, the installer or other user may modify one or more parameters based, e.g., on installation specifics. As one example, an installer might adjust a parameter for the speed of a circulator, to suit the total duct length at an installation site.

In various embodiments in which a replacement control is to be installed, a user may enter, e.g., by typing and/or by voice command, a part number of the old control into a software application on a smartphone. Additionally, or alternatively, the user may use the phone to take a picture of a label of the old control. The software application may thereby recognize the old control automatically and access the default setting(s) for the old control. This could be done also in relation to a product label and/or in relation to other part(s) of the system, e.g., to optimize most if not all settings.

Characters from a label could be recognized, and/or identifying information could be retrieved, e.g., from a bar code label, typed in or selected from a list, etc. The software application could use such label information, e.g., to query "the cloud" to retrieve default settings for the old control and automatically configure the default settings as selected settings for the replacement control. The installer may accept the default settings if desired, and/or make any desired changes via the application to the settings, e.g., before the settings are loaded into the new replacement control.

In some embodiments, actual settings of a new control may be stored based, e.g., on the location or address or serial number, as the new control is configured and installed Such information could be saved for future use. In various embodiments, an installer may be directed graphically, e.g., by an application on the installer's phone, which could "walk" the installer through decision points in an installation process and let the installer decide each step.

A first step might be, e.g., for the installer to: (a) type, speak, or otherwise enter into the application, control/product information for an existing control that is to be replaced, (b) take a picture of the label of the existing control, or (c) skip to a following step. The following step might be for the installer to make a selection of what the existing control is to be replaced with. In various embodiments, the application might suggest a replacement control and provide a replacement control number.

The application may also suggest other or additional system part number(s)/control number(s) and/or parameters. The installer may accept defaults and/or change them. In various embodiments, the application may store default settings for a wireless-enabled control in the cloud, on a remote server, etc., so that when the control is replaced, the exact defaults can be loaded into the new control.

It should be noted generally that although embodiments are described herein with reference to universal HVAC controllers, embodiments are also contemplated in relation to non-universal controllers. It also should be noted that unless otherwise indicated, terms such as "configuration," set-up," "installation," "configuring," "setting up" and "installing" may be used interchangeably herein. Embodiments are contemplated relative to various parameters, commands, settings, etc., whereby climate control system controls may be operated and/or made operable.

Figure 1:
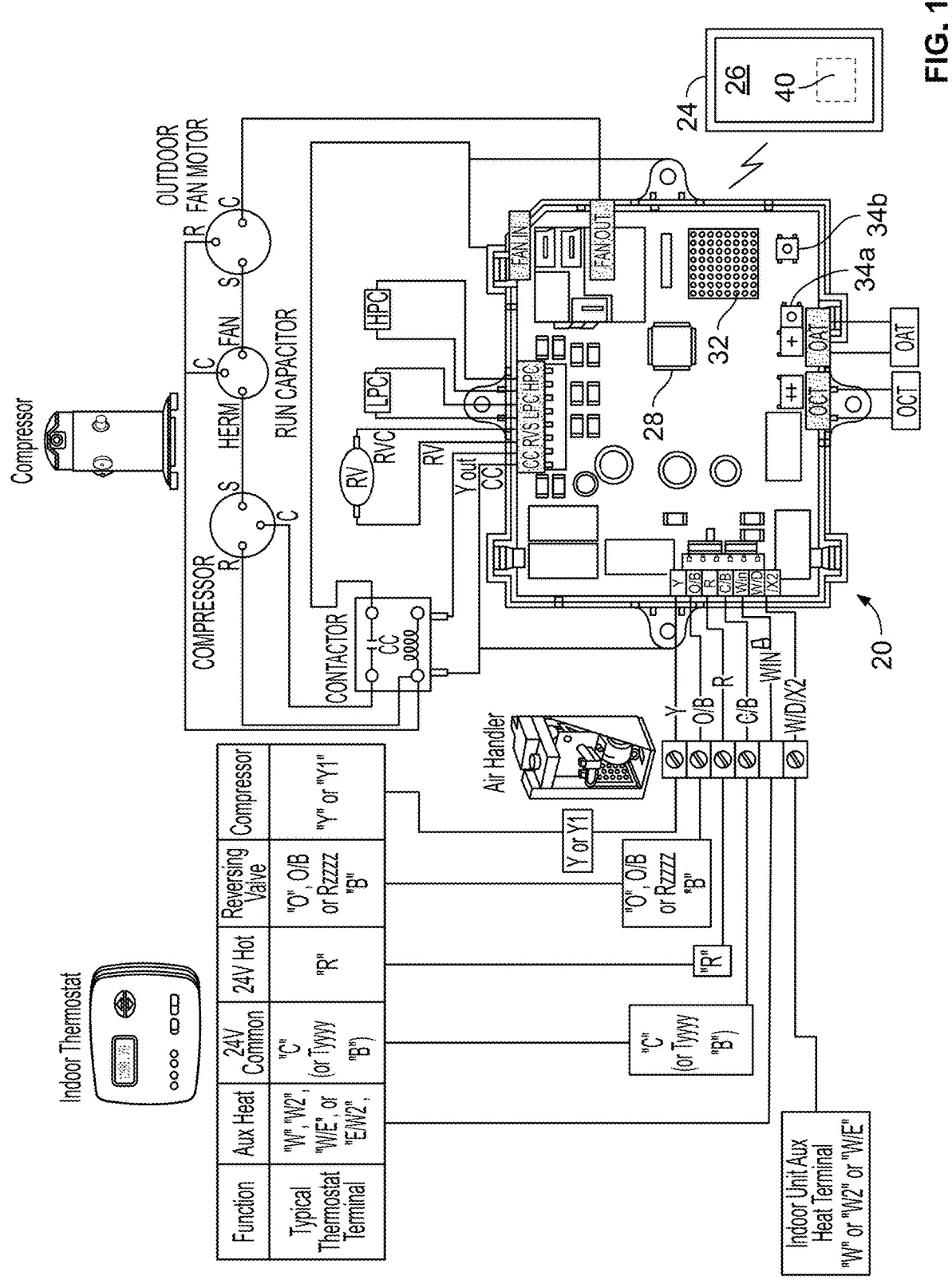
FIG. 1 illustrates a universal heat pump defrost control and a mobile device, each configured in accordance with one example embodiment of the disclosure.

With reference now to the figures, FIG. 1 illustrates an exemplary embodiment of an example universal heat pump defrost control 20 embodying one or more aspects of the present disclosure. The universal defrost control 20 may be used, e.g., as replacement for any one of a plurality of different defrost controls made by different manufacturers and that have different set-up parameters. Typically, after a defrost control has been wired into a climate control system, the installer determines which setup parameters to apply in the defrost control.

The defrost control 20 includes a microcontroller 28, which in the present example embodiment is a PIC24F-type microcontroller. The defrost control 20 also includes a display device 32, which in the present example embodiment is a dot matrix LED display controlled by the microcontroller 28. An "option" push button 34a and a "select" push button 34b may be used for selecting a menu on the LED display 32 and then setting or adjusting operational parameters for the selected menu.

Additionally, or alternatively, the LED display 32 and push buttons 34a-34b may be used for recalling a fault. In various embodiments of the present disclosure, however, an installer may additionally or alternatively use a software application to make such determinations and to push appropriate setup parameters to the defrost control 20. For example, the defrost control 20 is wirelessly connectable with a mobile computing device 24, e.g., a smartphone, tablet, laptop, etc., (hereinafter referred to as "mobile device.") The mobile device 24 has a processor and memory 40 that includes and/or has access to a software application executable to configure the defrost control 20, e.g., as further described below. The mobile device 24 also has a display, e.g., a touchscreen 26, and, in various embodiments, a voice processing capability.

As shown in FIG. 2, the example defrost control 20 and mobile device 24 are both Bluetooth-enabled and may communicate with each other, e.g., via BLE (Bluetooth Low Energy) communication interfaces. The example mobile device 24 includes a Bluetooth module 50 having J6 connections 54.

In the present example embodiment, the connections 54 may provide the following functionalities. "Reset" enables the Bluetooth module 50 in the mobile device 24 to be reset. "GND" and "3-6 VDC" connect respectively to grounding and power provided in the mobile device 24. "DTR" may be activated to send a "data terminal ready" signal. "SW-1" is for enabling/disabling Bluetooth connectivity. "CTS" may be activated to send a "clear to send" signal. "TxD" may be activated to send a "transmitted data" signal. "RTS" may be activated to send a "request to send" signal. "RxD" may be activated to send a "received data" signal. "DSR" may be activated to send a "data set ready" signal.

The example defrost control 20 includes a Bluetooth interface 60 having connections 64 that correspond to the mobile device 24 connections 54. Thus, for example, data sent wirelessly by the mobile device 24 via the "TxD" pin of the Bluetooth module 50 may be received by the microcontroller 28 via the "Rx" pin of the Bluetooth interface 60, and data sent wirelessly by the microcontroller 28 of the defrost control 20 via the "Tx" pin of the Bluetooth interface 60 may be received by the mobile device 24 via the "RxD" pin of the Bluetooth module 50. The "DIGGND" and "3.3V" connections provide the Bluetooth interface 60 with power from power circuits (not shown) of the defrost control 20.

The "BT Reset" of the interface 60 may be connected to a switch, e.g., to a momentary pushbutton (not shown) and activated to perform a hardware reset of the interface 60.

In some embodiments, the reset capability may be used in a pairing process between the defrost control 20 and the mobile device 24. For example, a user may push a reset button on the defrost control 20 to reset the entire control. As the control 20 powers back up, it may start the Bluetooth radio in pairing mode. The software application, which is running at the same time, may acknowledge the pairing request when the user uses the mobile device 24 to activate the acknowledgement. The application and the mobile device 24 thus would be paired to the control 20.

The user then may configure the control 20 using the software application and Bluetooth connection. In some embodiments, a pairing button or other switch may be provided on the control 20 instead of a reset switch. The example Bluetooth interface 60 is an OBS421 module, manufactured by ublox AB, which includes a microprocessor and radio. It should be noted, however, that although the Bluetooth interface 60 is shown in FIG. 2 as an integral Bluetooth module, various components could be integrated into a control in various ways to provide a Bluetooth and/or other radio interface.

In various embodiments, an installer may use the software application on the mobile device 24 to configure the universal defrost control 20 for operation in a particular climate control system. In some embodiments, the software application displays, on the mobile device touchscreen 26, a main menu having an item for "manufacturer selection." Additionally, or alternatively, the software application may provide menu items audibly, from the mobile device 24 to an installer.

In the present example embodiment, the installer may select the "manufacturer selection" menu item to display a list of manufacturers (OEMs) that provide a defrost control as part of their equipment lineup. The installer may use the touchscreen 26 to select one of the manufacturers, e.g., by touching one of the OEM names displayed in the list, or by using a voice command, to transmit a selection of one of the manufacturers to the software application on the mobile device 24. In response to the installer's OEM selection, the software application may transmit parameter values corresponding to the selected OEM to the microcontroller 28 for populating parameters of the universal defrost control 20.

FIG. 3 illustrates an example list of OEMs 300 and corresponding defrost control parameters 308 for each OEM. Under "Defrost Type", "T/T" means time/temperature. When T/T defrosting is performed, an outdoor unit runs a fixed number of minutes in heat pump mode, then performs a defrost cycle, and then returns to heat pump mode. "Demand" is a defrost method in which the unit only performs a defrost cycle when it is needed. This is typically done using two temperature sensors, one on the coil, the other sensing the outdoor temperature.

Referring to FIG. 1, for example, the universal defrost control 20 receives sensor input from a coil temperature sensor OCT and an outdoor ambient temperature sensor OAT. When the difference, during operation, of the coil temperature and the outdoor temperature exceeds a given value, e.g., 10° F., the unit performs a defrost cycle. This method works on the principle that frost forms an insulating barrier to the heat exchanger and alters the typical delta between the coil and outdoor temperature.

In various embodiments, a software application on a mobile device is configured to assist an installer by displaying, speaking, and/or otherwise providing information pertinent, e.g., to selectable parameters. Additionally, or alternatively, a software application on a mobile device may be configured to receive voice commands from an installer requesting and/or providing information to the software application. In various embodiments, a plurality of menu choices and submenu values may be provided on the touchscreen 26 for selection therefrom by the installer. The installer may use such menus to configure a defrost control "manually," i.e., without using parameters as may be automatically provided for a given OEM.

Additionally, or alternatively, the installer may select from such menus in order to make adjustments to certain parameters. Example set-up features that may be provided as menu choices are listed and described in FIGS. 4A and 4B. An example main menu screen, shown in FIG. 5A, includes most of the set-up parameters of FIGS. 4A and 4B. As shown in FIG. 5A, parameters are characterized as "System Settings", "Temperature Settings", "Time Settings", and "Special Settings".

In various embodiments, the software application allows a given menu item to be selectable only if it is consistent with setting(s) previously selected by the installer. For example, because the first setting selection, "Defrost Type", has been set to "Demand", a setting applicable only to "T/T" defrost is not available for selection by the installer. Thus a "Time Settings" menu item for "Defrost Cycle Time" is set to "N/A". In this way, the installer may be guided to select only parameters as appropriate for the control being configured.

If the installer selects "Display Orientation" on the main menu, a display orientation selection screen is displayed, e.g., as shown in FIG. 5B. The installer then may select an orientation for displays on the defrost control LED display 32. Generally, a display can be difficult to read when the orientation of equipment holding the display is changed. For example, many furnaces can be installed up-flow, down-flow, or horizontally and may be field-convertible. As shown in FIG. 5B, the installer may select from four different orientations of the LED display 32, e.g., by touching the selected orientation on the touchscreen 26. The installer thus may change the orientation from the upright "Hi" orientation (shown in FIG. 5A as the current orientation) to one of the other three orientations if desired.

In various embodiments, the software application is configured to assist an installer by displaying information pertinent to selectable parameters. For example, if an installer selects "Low Temp Compressor Cutout" from the main menu of FIG. 5A, a selection screen may be displayed, e.g., as shown in FIG. 5C. A range of low temperatures is displayed from which the installer may select an outdoor temperature at which heat pump operation is prevented. In addition to the low temperature range, the selection screen of FIG. 5C displays a description of how the "Low Temp Compressor Cutout" parameter is used by the defrost control 20, and the impact of that selection.

For example, FIG. 5C illustrates that the installer selected 30 degrees Fahrenheit (° F.) from the range of possible temperature selections from 15° F. to 35° F. (in 5° F. increments). Also, by way of example, the selection screen shown in FIG. 5C includes the following: "If the outdoor ambient temperature is below the low temperature cutout selected above, the control will prevent heat pump operation and only allow auxiliary heat (inDegrees F.). This will result in greater energy usage and enhanced user comfort." Accordingly, FIG. 5C illustrates an example of how the selection screen may display a description of how the "Low Temp Compressor Cutout" parameter is used by the defrost control 20 and the impact of that selection.

As another example, a range of temperatures may be displayed from which the installer may select a defrost termination temperature. The different available selections for the defrost termination temperature include 50° F., 60° F., 65° F., 70° F., 75° F., 80° F., 90° F., and 100° F., wherein 70° F. is a default setting. The defrost termination temperature may be defined as the coil temperature used to terminate a defrost cycle, wherein the goal is the ensure a completely clear coil before ending the defrost cycle. In this example, an explanation of the impacts of making different defrost termination temperature selections may include that higher temperature values will generally result in a longer defrost cycle, which, in turn, will result in increased energy usage as backup heat (gas or electric) will be used. The explanation may also include suggestions, such as one or more of:

- if the heat pump is not installed on snow legs or otherwise elevated off the ground, a higher value may be necessary;
- if the heat pump is installed in an area with windy conditions, a higher value may be necessary;
- if the heat pump is installed in a geographical area where high humidity and icing can be expected, a higher value may be necessary; and
- the lowest value that will typically result in a clear coil after defrost will yield the greatest system efficiency.

In exemplary embodiments, the user interface of a mobile device is configured to allow the installer (broadly, a user) to access the explanation of the impacts of making different available defrost termination temperature selections before the installer makes a specific selection from the different available defrost termination temperature selections.

When the installer has completed parameter selection, the installer may touch "Configure" on the main menu screen, to instruct the software application to wirelessly push the selected parameters to the defrost control 20. A status screen may then be displayed, e.g., as shown in FIG. 5D. In various embodiments, if configuration was not successful, the software application may communicate with the defrost control microcontroller 28 to determine and display any errors.

Another example embodiment of a control is shown in FIG. 6. An example integrated furnace control ("IFC") 600 includes a microprocessor with memory, a radio 608, and an antenna 612 configured for wireless communication, e.g., via Bluetooth LE, with a mobile device 624, e.g., a phone or tablet having a display screen 628. On the mobile device display screen 628 is displayed an example menu of heating and cooling delays, thermostat settings, and other settings, such as an alarm relay setting. The various settings are selectable, e.g., by an installer of the IFC 600.

In another example embodiment, an HVAC system includes at least one HVAC component, and an HVAC control configured to control the at least one HVAC component according to one or more HVAC system configuration parameters. The HVAC control includes a controller wireless interface and a memory. The system also includes a mobile device having a user interface and a mobile wireless interface in wireless communication with the controller wireless interface of the HVAC control.

The mobile device is configured to display the one or more HVAC system configuration parameters on the user interface, receive user input settings for the one or more HVAC system configuration parameters, and wirelessly transmit the received user input settings for the one or more HVAC system configuration parameters to the controller wireless interface of the HVAC control.

The HVAC control is configured to store the received user input settings for the one or more HVAC system configuration parameters in the memory of the HVAC control to control the at least one HVAC component according to the received user input settings for the one or more HVAC system configuration parameters.

In some cases, the HVAC control includes a control board and the controller wireless interface includes a short-range wireless communication interface (e.g., BLUETOOTH). The mobile device may include a mobile phone, a tablet computer, etc. The user interface of the mobile device may be configured to display selection information corresponding to each of the one or more HVAC system configuration parameters indicative of effects of different selection options for said HVAC system configuration parameters on performance of the HVAC system.

The user interface of the mobile device may be configured to receive at least one of an installation date, a location and an installer name. In that case, the mobile device is configured to wireless transmit the received at least one of an installation date, a location and an installer name to the controller wireless interface of the HVAC control, and the HVAC control is configured to store the received at least one of an installation date, a location and an installer name in the memory.

The HVAC system may include at least one of a wireless air temperature sensor, a wireless coil temperature sensor and a wireless humidity sensor, and the mobile device can be configured to wirelessly transmit one or more setting parameters of the wireless air temperature sensor, the wireless coil temperature sensor and/or the wireless humidity sensor to the controller wireless interface of the HVAC control. In some cases, the mobile device is configured to wirelessly transmit a software update to the controller wireless interface of the HVAC control, and the HVAC control is configured to store the received software update in memory.

In some embodiments, the HVAC control is configured to wirelessly transmit at least one of a fault code and operational data to the mobile wireless interface of the mobile device, and the mobile device is configured to display the received fault code and/or operational data on the user interface. For example, the operational data may include, but is not limited to, flame sense readings over time, air temperature readings over time, coil temperature readings over time, a defrost cycle, a serial number, a model number, an installation date, runtime data, a geographical location, etc.

The mobile device may be configured to determine a model number identifier of the HVAC control and to display installation information corresponding to the HVAC control in response to the determined model number identifier of the HVAC control. In some cases, the HVAC control is configured to wirelessly transmit settings of the one or more HVAC system configuration parameters that are currently stored in the memory of the HVAC control to the mobile wireless interface of the mobile device.

According to another example embodiment of the present disclosure, an HVAC system includes at least one HVAC component, and an HVAC control configured to control the at least one HVAC component according to one or more HVAC system configuration parameters. The HVAC control includes a controller wireless interface and a memory.

The HVAC system also includes a mobile device having a user interface, a camera, and a mobile wireless interface configured for wireless communication with the controller wireless interface of the HVAC control. The mobile device is configured to obtain an identity of the HVAC control which identity is determined by parsing an image of a label of the HVAC control as captured by the camera or by receiving a model number of the HVAC control entered into the user interface.

For example, the mobile device may be configured to determine the identity of the HVAC control by the mobile device parsing the image of the label of the HVAC control as captured by the camera or by the mobile device receiving the model number of the HVAC control entered into the user interface. Alternatively, or in addition, a remote device (e.g., a remote server) could determine the identity of the HVAC control, etc.

The mobile device is also configured to cause default settings for the one or more HVAC system configuration parameters from a remote server based on the identified HVAC control to be wirelessly transmitted to the controller wireless interface of the HVAC control.

For example, the mobile device may be configured to obtain the default settings for the one or more HVAC system configuration parameters from the remote server based on the identified HVAC control, and wirelessly transmit the settings for the one or more HVAC system configuration parameters to the controller wireless interface of the HVAC control. Alternatively, or in addition, a remote device (e.g., a remote server) could wirelessly transmit the settings to the HVAC control, etc.

The HVAC control is configured to store the received settings for the one or more HVAC system configuration parameters in the memory of the HVAC control to control the at least one HVAC component according to the received settings for the one or more HVAC system configuration parameters.

In this example embodiment, the label may include at least one of a product label of the HVAC control and a barcode label of the HVAC control, and the mobile device may be configured to parse the image by recognizing characters in the product label and/or the barcode label. Alternatively, or additionally, the mobile device may be configured to receive the model number of the HVAC control by displaying a list of possible HVAC control model numbers and receiving a user selection from the displayed list.

In some cases, the mobile device is configured to display the received default settings from the remote server on the user interface of the mobile device, receive adjustments to the default settings via user input at the user interface, and wirelessly transmit the adjusted settings to the controller wireless interface of the HVAC control. In that case, the mobile device may be configured to save the adjusted settings along with at least one of a location, and address and a serial number of the HVAC control. The mobile device may be configured to determine a suggested replacement HVAC control based on the identified HVAC control and display the suggested replacement HVAC control on the user interface.

According to another example embodiment of the present disclosure, a method of controlling an HVAC system including an HVAC component is disclosed. The method includes controlling, by the HVAC control, the at least one HVAC component according to one or more HVAC system configuration parameters, displaying the one or more HVAC system configuration parameters on a user interface of the mobile device and receiving, via the user interface, user input settings for the one or more HVAC system configuration parameters.

The method also includes wirelessly transmitting the received user input settings for the one or more HVAC system configuration parameters from the mobile device to a controller wireless interface of the HVAC control, and storing the received user input settings for the one or more HVAC system configuration parameters in a memory of the HVAC control to control the at least one HVAC component according to the received user input settings for the one or more HVAC system configuration parameters.

In some embodiments, the method may include identifying, by the mobile device, the HVAC control by parsing an image of a label of the HVAC control as captured by a camera on the mobile device, or by receiving a model number of the HVAC control entered into the user interface, and obtaining default settings for the one or more HVAC system configuration parameters from a remote server based on the identified HVAC control.

According to another example embodiment, an HVAC control includes a control interface in communication with at least one HVAC component to control the at least one HVAC system according to one or more HVAC system configuration parameters, a controller wireless interface configured for wireless communication with a mobile wireless interface of a mobile device, and a memory.

The HVAC control is configured to wirelessly receive user input settings for the one or more HVAC system configuration parameters from the mobile device via the controller wireless interface of the HVAC control. The HVAC control is also configured to store the received user input settings for the one or more HVAC system configuration parameters in the memory of the HVAC control to control the at least one HVAC component according to the received user input settings for the one or more HVAC system configuration parameters.

Example HVAC controls and mobile devices described herein may be configured to perform operations using any suitable combination of hardware and software. For example, the HVAC controls and mobile devices may include any suitable circuitry, logic gates, microprocessor(s), computer-executable instructions stored in memory, etc., operable to cause the HVAC controls and mobile devices to perform actions described herein (e.g., controlling an HVAC component, wirelessly transmitting settings, etc.).

In various embodiments in which an installer's mobile device includes voice processing capability, an installer may issue voice commands to the mobile device. In some embodiments, a software application on the mobile device processes a voice command from the installer and transmits a corresponding digital command wirelessly to a climate control system control.

The control may wirelessly transmit a response to the software application, in which case the software application provides a corresponding voice response to the installer on the mobile device. Thus, for example, an installer may issue voice commands via a smartphone to an IFC to set up and configure the IFC, to troubleshoot, and/or to obtain diagnostics regarding the IFC. The installer may speak into the smartphone, e.g., to ask, "What is the flame sense reading?" and the IFC may wirelessly transmit a response, e.g., "0.2 micro Amps," which is spoken to the installer by the smartphone. As another example, an installer may issue a voice command to an IFC to turn on the circulator for a test. The installer thus is provided with a convenient way to test the circulator, without having to open up the unit and use a jumper wire.

As still another example, an installer could issue a voice command to a heat pump defrost control to "run a forced defrost." Generally, it should be understood that the processing of mobile device commands and/or climate control system control responses (whether given by voice or otherwise) could be distributed in various ways, e.g., between a given mobile device and a given climate control system control.

Embodiments of the disclosure can facilitate an installer's configuration of controls. Installation can take less time and can be less error-prone than when installation is performed manually. Rather than having to set multiple dipswitches or navigating through a long menu that uses LEDs and push buttons, an installer can configure all necessary settings using a software application, and then push the data to the control. The software application can provide more detail on available configuration selections to help a service technician make better choices.

For example, before a user chooses a defrost enable temperature, the user may access an explanation by the software application of the impact(s) of making different available selections. See, for example, FIG. 5C. Wireless alarms and sensors for air temperature, coil temperature, humidity, etc., and more, could be easily added, in contrast to the difficulty or impossibility of adding alarms and/or system sensors where hard wiring is a requirement. Installation date, location, installer name, and other data could be loaded to the control for future warranty tracking and analysis.

Various embodiments can provide advantages relating to control servicing. For example, software updates could be pushed to the control in the field and/or remotely. Fault codes and/or other operational data could be received from the control without having to open up the unit. This may reduce (e.g., eliminate) miscounting of the blinks of an LED. Fault codes can include information on the basic system items to check out for any given code, like an embedded fault tree.

System data could be logged and sent to the application on the mobile device for analysis during a service call. Examples might be flame sense readings over time, air and coil temperature readings over time or during an event, such as a defrost cycle. A service technician could work in a comfortable space to do the necessary configuration work, e.g., before going to the unit for upload. For example, the technician would not have to stand outside on a 10-degree day while configuring a new universal heat pump control. Software application embodiments can also provide much of the data typically found in a printed installation manual, e.g., once the individual control is identified by its model number.

Various embodiments can provide advantages relating to control replacement. For example, an original equipment manufacturer (OEM) of a given control can add items to be configured on the control, without worrying that the control might become too complex for an average service technician to work on.

In various embodiments, configuration settings from the existing control can be uploaded and transferred to the replacement control. Unit serial number, model number, installation dates, installer name, lifetime heating/cooling/defrost/other cycles, runtime data, geographical location and more could be pulled from the control for improved warranty reporting and analysis. Warranty-supporting information is often unavailable for many existing controls, since there typically is no way to upload such information to the controls. Unlike most standard controls, software on the foregoing control embodiments can be updated in the field, if needed. Supporting documentation for a given control embodiment can be stored, instead of becoming lost or unreadable over time from age.

In exemplary embodiments, an HVAC system comprises at least one HVAC component, an HVAC control, and a mobile device. The HVAC control is configured to control the at least one HVAC component according to one or more HVAC system configuration parameters. The HVAC control includes a controller wireless interface and a memory. The mobile device includes a user interface and a mobile wireless interface. The mobile device is configured to display the one or more HVAC system configuration parameters on the user interface, receive user input settings for the one or more HVAC system configuration parameters, and wirelessly transmit the received user input settings for the one or more HVAC system configuration parameters to the controller wireless interface of the HVAC control. The HVAC control is configured to store the received user input settings for the one or more HVAC system configuration parameters in the memory of the HVAC control to control the at least one HVAC component according to the received user input settings for the one or more HVAC system configuration parameters.

In exemplary embodiments, the user interface of the mobile device is configured to allow a user to access an explanation of the impacts of making different available selections before the user makes a specific selection from the different available selections. The explanation of impacts includes one or more of Heat ON delay, Heat OFF delay, Cool ON delay, Cool OFF delay, heat airflow setting, cool airflow setting, and/or fan airflow setting.

Heat ON delay refers to the time from Heat ON until the airflow is started with the fan or blower. Heat OFF delay refers to the time from Heat OFF until the airflow is stopped with the fan or blower. Cool ON delay refers to the time from Cool ON until the airflow is started with the fan or blower. Cool OFF delay refers to the time from Cool OFF until the airflow is stopped with the fan or blower. Heat airflow setting refers to the setting level of airflow when there is heating. Cool airflow setting refers to the setting level of airflow when there is cooling. Fan airflow setting refers to the setting level of airflow when there is cooling. For each of these airflows, if there is two stages of either heat or cool, the airflow settings are typically higher for second stage versus first stage, so there are two of each for two stage systems. Also, heating airflow for heat pump might be quite different than heat speed for gas heat when it switches over from heat pump to gas heat. For modulating systems, there is typically airflow that increases as the heat might rise from 30% to 100% of the heat capacity. Cool can be the same but is less common to have.

Generally, the most common outdoor units are either air conditioning (AC) only, or they can do AC and Heat pump (HP). It is important for the indoor unit to know the outdoor size, typically in tonnage (e.g., 1 ton to 5 tons in increments of 0.5 tons, etc.). From this, the heat pump air flow and/or the AC airflow can be obtained close. It is also helpful for the indoor unit to know the type of outdoor unit-AC only or AC/HP. Generally, the indoor unit can be a gas furnace that burns gas for heat (e.g., liquid propane or natural gas), an air handler (typically has banks of electric heat), or a gas furnace without gas capability and is provided for airflow for the outdoor unit, which may be used in areas where gas or electric heat is never needed and heat pump heat is enough year round.

A term called TRIM is sometimes used to adjust the airflow up or down based on a nominal. This is typically done with DIP switches on the indoor board or on a thermostat menu with wired communicating systems. Another setting for what is called dual fuel is a balance point, or changeover point. This is the outside temperature where the heating source is changed from heat pump to the backup, which is gas heat or electric heat typically.

Different types of airflow motors are used in indoor units. For example, an indoor unit may include a speed type of airflow motor (e.g., permanent split capacitor (PSC) motor, etc.). As another example, an indoor unit may include a torque type of airflow motor (e.g., constant torque motor (CTM), etc.), which may have 5 taps that give a different torque setting for each tap. Some torque type airflow motors have the ability to have more than one tap on at a time to give 9 speeds, and in theory, up to 31 speeds can be achieved.

As a further example, an indoor unit may include an airflow or CFM based type of motor. The airflow or CFM motor may be a communicating motor. The indoor control may command a CFM or cubic feet per minute airflow and the motor tries to achieve that airflow. For gas furnaces, the manufacturer knows that the airflow should not be allowed below a minimum for the furnace to not get too hot based on the unit size. For these types of motors, the indoor control can command a large variety of airflows, typically based on a nominal value, e.g., from X % to Y % of default speed where X % is less than 100% and Y % is greater than 100% for gas heating. The airflow used with an outdoor unit depends on size of the outdoor unit. Typical rules of a certain CFM per TON can be used, which can be adjusted up or down. For proper dehumidification, it is very important to use the "right" airflow, so these airflow or CFM type motors are flexible to allow the right amount of airflow to be used.

In exemplary embodiments, the controller wireless interface includes a short-range wireless communication interface. The mobile wireless interface includes a short-range wireless communication interface. The HVAC system comprises a second HVAC control including a short-range wireless communication interface. An identifier of the HVAC control and the received user input settings stored in the memory of the HVAC control are retrievable from the memory of the HVAC control and downloadable to the second HVAC control, via wireless communication between the short-range wireless communication interface of the HVAC control, the short-range wireless communication interface of the mobile device, and the short-range wireless communication interface of the second HVAC control. The identifier of the HVAC control and the received user input settings are downloadable to the second HVAC control as default settings and/or usable for configuring the second HVAC control.

In exemplary embodiments, the short-range wireless communication interface of the HVAC control may comprise a Near Field Communication (NFC) short-range wireless communication interface. The short-range wireless communication interface of the mobile device may comprise a Near Field Communication (NFC) short-range wireless communication interface. The short-range wireless communication interface of the second HVAC control may comprise a Near Field Communication (NFC) short-range wireless communication interface.

In exemplary embodiments, the second HVAC control may be a replacement for the HVAC control. The identifier of the HVAC control and the received user input settings downloadable to the second HVAC control may be usable for configuring the second HVAC control for use in controlling the HVAC component according to the one or more HVAC system configuration parameters.

In exemplary embodiments, the HVAC system may include a second HVAC component. The identifier of the HVAC control and the received user input settings downloadable to the second HVAC control may be usable for configuring the second HVAC control for use in controlling the second HVAC component.

In exemplary embodiments, the identifier of the HVAC control and the received user input settings may be retrievable directly from the memory of the HVAC control via the mobile device without retrieving the identifier of the HVAC control and the received user input settings from a remote server or the cloud.

In exemplary embodiments, the at least one HVAC component is a first HVAC component. The HVAC control is a first HVAC control. The HVAC system includes a second HVAC component. One or more component properties and/or configuration parameters of the second HVAC component are obtainable, via the mobile device. The one or more component properties and/or configuration parameters of the second HVAC component are usable for configuring the first HVAC control for controlling the first HVAC component in accordance with the one or more component properties and/or configuration parameters of the second HVAC component.

In exemplary embodiments, the first HVAC component comprise an indoor HVAC component. The second HVAC component comprise an outdoor HVAC component. One or more component properties and/or configuration parameters of the outdoor HVAC component are obtainable via the mobile device. The one or more component properties and/or configuration parameters of the outdoor HVAC component are usable for setting up the first HVAC control to control the indoor HVAC component in accordance with the one or more component properties and/or configuration parameters of the outdoor HVAC component. The one or more component properties and/or configuration parameters of the outdoor HVAC component may include one or more of an outdoor unit size, whether the outdoor HVAC component is configured for air conditioning only or configured for air conditioning and heat pump, and/or whether the outdoor HVAC component is single stage, two stage, or modulating. The one or more component properties and/or configuration parameters of the outdoor HVAC component may be usable for configuring indoor airflow required for air conditioning and/or heat pump mode of the indoor HVAC component. The mobile device may be configured to obtain the one or more component properties and/or configuration parameters of the outdoor HVAC component by parsing an image of a label as captured by a camera, or by the mobile device receiving the one or more component properties and/or configuration parameters of the outdoor HVAC component entered into the user interface. The indoor HVAC component may comprise a replacement indoor HVAC component. Or the outdoor and indoor HVAC components may comprise new outdoor and indoor HVAC components of a new HVAC system installation.

In exemplary embodiments, the one or more component properties and/or configuration parameters of the second HVAC component are retrievable, via the mobile device, from the memory of a second HVAC control and/or from a remote server or the cloud. Additionally, or alternatively, the mobile device is configured to obtain the one or more component properties and/or configuration parameters of the second HVAC component by parsing an image of a label as captured by a camera, or by the mobile device receiving the one or more component properties and/or configuration parameters of the outdoor HVAC component entered into the user interface, or by a second HVAC control wirelessly transmitting the one or more component properties and/or configuration parameters of the second HVAC component to the mobile wireless interface of the mobile device.

In exemplary embodiments, the HVAC component comprises a blower. The mobile device is configured to receive a user input setting of the blower speed and wirelessly transmit, via the mobile wireless interface, the received user input setting of the blower speed to the controller wireless interface of the HVAC control.

In exemplary embodiments, the HVAC control is configured to wirelessly transmit operational data to the mobile wireless interface of the mobile device, the operational data including flame current. The mobile device is configured to display the flame current on the user interface in response to receiving a user input setting to show flame current.

In exemplary embodiments, the mobile device is configured to determine an identifier of the HVAC control by parsing an image of a label of the HVAC control as captured by a camera, or by the mobile device receiving the identifier of the HVAC control entered into the user interface, or by the HVAC control wirelessly transmitting the identifier of the HVAC control to the mobile wireless interface of the mobile device. The mobile device is configured to determine a suggested replacement HVAC control based on the determined identifier of the HVAC control and to display the suggested replacement HVAC control on the user interface; and/or the mobile device is configured to display installation information corresponding to the HVAC control in response to the determined identifier of the HVAC control.

In exemplary embodiments, the mobile device is configured to determine an identifier of the HVAC control by parsing an image of a label of the HVAC control as captured by a camera, or by the mobile device receiving the identifier of the HVAC control entered into the user interface, or by the HVAC control wirelessly transmitting the identifier of the HVAC control to the mobile wireless interface of the mobile device. The mobile device is configured to cause default settings for the one or more HVAC system configuration parameters from a remote server based on the determined identifier of the HVAC control to be wirelessly transmitted to the controller wireless interface of the HVAC control. The HVAC control is configured to store the default settings for the one or more HVAC system configuration parameters in the memory of the HVAC control to control the at least one HVAC component according to the default settings for the one or more HVAC system configuration parameters.

In exemplary embodiments, an HVAC system comprises a first HVAC component, a first HVAC control, and a mobile device. The first HVAC control is configured to control the first HVAC component according to one or more first HVAC system configuration parameters, the first HVAC control including a first controller wireless interface and a first memory. The mobile device includes a user interface and a mobile wireless interface. The mobile device is configured to display the one or more HVAC system configuration parameters on the user interface, receive user input settings for the one or more first HVAC system configuration parameters, and wirelessly transmit the received user input settings for the one or more first HVAC system configuration parameters to the first controller wireless interface of the first HVAC control. An identifier of the first HVAC control and the one or more first HVAC system configuration parameters are retrievable, via the mobile device, from the first memory of the first HVAC control and/or from a remote server.

In exemplary embodiments, the HVAC system includes a second HVAC control, whereby the identifier of the first HVAC control and the one or more first HVAC system configuration parameters are usable for configuring the second HVAC control. The second HVAC control may be a replacement for the first HVAC control. The identifier of the first HVAC control and the one or more first HVAC system configuration parameters may be downloadable to the second HVAC control as default settings and/or usable for configuring the second HVAC control for use in controlling the first HVAC component according to the one or more first HVAC system configuration parameters. The first controller wireless interface may include a short-range wireless communication interface. The mobile wireless interface may include a short-range wireless communication interface. The second HVAC control may comprise a second controller wireless interface including a short-range wireless communication interface. The identifier of the first HVAC control and the one or more first HVAC system configuration parameters may be retrievable from the first memory of the first HVAC control and/or from the remote server and downloadable to the second HVAC control via wireless communication between the short-range wireless communication interface of the first HVAC control, the short-range wireless communication interface of the mobile device, and the short-range wireless communication interface of the second HVAC control.

In exemplary embodiments, the short-range wireless communication interface of the first HVAC control may comprise a Near Field Communication (NFC) short-range wireless communication interface. The short-range wireless communication interface of the mobile device may comprise a Near Field Communication (NFC) short-range wireless communication interface. The short-range wireless communication interface of the second HVAC control may comprise a Near Field Communication (NFC) short-range wireless communication interface.

In exemplary embodiments, the HVAC system includes a second HVAC component. One or more component properties and/or configuration parameters of the second HVAC component are obtainable, via the mobile device. The one or more component properties and/or configuration parameters of the second HVAC component are usable for configuring the first HVAC control for controlling the first HVAC component in accordance with the one or more component properties and/or configuration parameters of the second HVAC component.

In exemplary embodiments, the first HVAC component comprise an indoor HVAC component. The second HVAC component comprise an outdoor HVAC component. One or more component properties and/or configuration parameters of the outdoor HVAC component are obtainable via the mobile device. The one or more component properties and/or configuration parameters of the outdoor HVAC component are usable for setting up the first HVAC control to control the indoor HVAC component in accordance with the one or more component properties and/or configuration parameters of the outdoor HVAC component. The one or more component properties and/or configuration parameters of the outdoor HVAC component may include one or more of an outdoor unit size, whether the outdoor HVAC component is configured for air conditioning only or configured for air conditioning and heat pump, and/or whether the outdoor HVAC component is single stage, two stage, or modulating. The one or more component properties and/or configuration parameters of the outdoor HVAC component may be usable for configuring indoor airflow required for air conditioning and/or heat pump mode of the indoor HVAC component. The mobile device may be configured to obtain the one or more component properties and/or configuration parameters of the outdoor HVAC component by parsing an image of a label as captured by a camera, or by the mobile device receiving the one or more component properties and/or configuration parameters of the outdoor HVAC component entered into the user interface. The indoor HVAC component may comprise a replacement indoor HVAC component. Or the outdoor and indoor HVAC components may comprise new outdoor and indoor HVAC components of a new HVAC system installation.

In exemplary embodiments, the one or more component properties and/or configuration parameters of the second HVAC component are retrievable, via the mobile device, from the memory of a second HVAC control and/or from a remote server or the cloud. Additionally, or alternatively, the mobile device is configured to obtain the one or more component properties and/or configuration parameters of the second HVAC component by parsing an image of a label as captured by a camera, or by the mobile device receiving the one or more component properties and/or configuration parameters of the outdoor HVAC component entered into the user interface, or by a second HVAC control wirelessly transmitting the one or more component properties and/or configuration parameters of the second HVAC component to the mobile wireless interface of the mobile device.

In exemplary embodiments, the identifier of the first HVAC control and the one or more first HVAC system configuration parameters are retrievable directly from the memory of the first HVAC control via the mobile device without retrieving the identifier of the first HVAC control and the one or more first HVAC system configuration parameters from a remote server or the cloud.

In exemplary embodiments, an HVAC system comprises a first HVAC component, a first HVAC control, a second HVAC component, a second HVAC control, and a mobile device. The first HVAC control is configured to control the first HVAC component according to one or more first HVAC system configuration parameters. The first HVAC control includes a first controller wireless interface and a first memory. The second HVAC control includes a second controller wireless interface and a second memory. The mobile device includes a user interface and a mobile wireless interface. An identifier of the first HVAC control and the one or more first HVAC system configuration parameters are retrievable, via the mobile device, from the first memory of the first HVAC control and/or from a remote server. The identifier of the first HVAC control and the one or more first HVAC system configuration parameters are usable for configuring the second HVAC control for use in controlling the second HVAC component according to one or more second HVAC system configuration parameters.

In exemplary embodiments, the first controller wireless interface includes a short-range wireless communication interface. The mobile wireless interface includes a short-range wireless communication interface. The second controller wireless interface includes a short-range wireless communication interface. The identifier of the first HVAC control and the one or more first HVAC system configuration parameters are retrievable from the first memory of the first HVAC control and/or from the remote server and downloadable to the second HVAC control via wireless communication between the short-range wireless communication interface of the first HVAC control, the short-range wireless communication interface of the mobile device, and the short-range wireless communication interface of the second HVAC control. The short-range wireless communication interface of the first HVAC control may comprise a Near Field Communication (NFC) short-range wireless communication interface. The short-range wireless communication interface of the mobile device may comprise a Near Field Communication (NFC) short-range wireless communication interface. The short-range wireless communication interface of the second HVAC control may comprise a Near Field Communication (NFC) short-range wireless communication interface.

In exemplary embodiments, the identifier of the first HVAC control and the one or more first HVAC system configuration parameters are retrievable directly from the memory of the first HVAC control via the mobile device without retrieving the identifier of the first HVAC control and the one or more first HVAC system configuration parameters from a remote server or the cloud.

In exemplary embodiments, an HVAC system comprises a first HVAC component; a first HVAC control, a second HVAC component, and a mobile device. The first HVAC control is configured to control the first HVAC component according to one or more first HVAC system configuration parameters. The first HVAC control includes a first controller wireless interface and a first memory. The mobile device includes a user interface and a mobile wireless interface. The mobile device is configured to obtain one or more component properties and/or configuration parameters of the second HVAC component. The one or more component properties and/or configuration parameters of the second HVAC component are usable for configuring the first HVAC control for controlling the first HVAC component in accordance with the one or more component properties and/or configuration parameters of the second HVAC component.

In exemplary embodiments, the first HVAC component comprise an indoor HVAC component. The second HVAC component comprise an outdoor HVAC component. One or more component properties and/or configuration parameters of the outdoor HVAC component are obtainable via the mobile device. The one or more component properties and/or configuration parameters of the outdoor HVAC component are usable for setting up the first HVAC control to control the indoor HVAC component in accordance with the one or more component properties and/or configuration parameters of the outdoor HVAC component. The one or more component properties and/or configuration parameters of the outdoor HVAC component may include one or more of an outdoor unit size, whether the outdoor HVAC component is configured for air conditioning only or configured for air conditioning and heat pump, and/or whether the outdoor HVAC component is single stage, two stage, or modulating. The one or more component properties and/or configuration parameters of the outdoor HVAC component may be usable for configuring indoor airflow required for air conditioning and/or heat pump mode of the indoor HVAC component. The mobile device may be configured to obtain the one or more component properties and/or configuration parameters of the outdoor HVAC component by parsing an image of a label as captured by a camera, or by the mobile device receiving the one or more component properties and/or configuration parameters of the outdoor HVAC component entered into the user interface. The indoor HVAC component may comprise a replacement indoor HVAC component. Or the outdoor and indoor HVAC components may comprise new outdoor and indoor HVAC components of a new HVAC system installation.

In exemplary embodiments, the one or more component properties and/or configuration parameters of the second HVAC component are retrievable, via the mobile device, from the memory of a second HVAC control and/or from a remote server or the cloud. Additionally, or alternatively, the mobile device is configured to obtain the one or more component properties and/or configuration parameters of the second HVAC component by parsing an image of a label as captured by a camera, or by the mobile device receiving the one or more component properties and/or configuration parameters of the outdoor HVAC component entered into the user interface, or by a second HVAC control wirelessly transmitting the one or more component properties and/or configuration parameters of the second HVAC component to the mobile wireless interface of the mobile device.

In exemplary embodiments, a software application (an App) resident on a mobile device (e.g., smartphone, tablet, etc.) is configured to be operable for automatically configuring settings for an HVAC control via the mobile device when a user uses the App to enters at least a portion of the HVAC control's part/model number (broadly, an identifier) and thereafter selects the HVAC control. The settings for the HVAC control (e.g., default settings, component properties, HVAC system configuration parameters, etc.) are stored directly in and retrievable directly from the memory of the mobile device via the App for download to the memory of the HVAC control. Accordingly, this exemplary embodiments allows the configuration settings for the HVAC control to be retrievable directly from the memory of the mobile device without having to retrieve any of the HVAC configuration settings from a remote server or the cloud.

FIGS. 7 through 19 are screenshots that may be displayed on a mobile device display screen (e.g., touchscreen, etc.) when using a software application (an App) resident on the mobile device to configure an HVAC control (which may be new or a replacement HVAC control) in accordance with one example embodiment of the disclosure As disclosed herein, the mobile device is configured, via the App, to automatically populate a correct configuration data set for a HVAC control selected by the user via the App, e.g., by entering at least a portion of a part/model number and searching for the HVAC control, scanning a label, etc. The configuration data for the HVAC control is retrievable and downloadable directly from the memory of the mobile device to the HVAC control (e.g., without having to first retrieve and download the configuration data from a remote server or the cloud).

The user may search for a valid cross reference part/model number inside the App. And the App is configured to automatically populate the correct configuration setting(s) based off the part/model number that was searched and selected by the user. The user may begin to type in a part/model number for an HVAC control being replaced. As the user enters more of the part/model number, the App may "drill down" and progressively present a shorter and shorter list of choices from the memory of the mobile device as to which control is being entered by the user. When the user recognizes the correct choice of the control displayed in the list of choices generated by the App, the user may then select the control from the list, e.g., by touching the part/model number on the touchscreen display of the mobile device, etc. In response to the user selection of the control's part/model number in the list generated by the App, the App automatically presents the correct configuration data (e.g., one or more component properties, configuration parameters for the HVAC control, etc.) for the replacement HVAC control. Advantageously, the user may then download the correct configuration data directly from the memory of the mobile device to the replacement HVAC control via short-range wireless communication interfaces (e.g., BLUETOOTH (BT), Near Field Communication (NFC), etc.) or other radio communication interfaces of the mobile device and replacement HVAC control.

With continued reference to FIGS. 7 to 19, an introductory screen may be displayed on the mobile device when the App is first opened. The introductory screen may indicate that the App is initializing. During the initialization, the App may determine whether or not Internet connectivity is available to the mobile device.

Although the App's functionality (e.g., database of VAC control part/model numbers, HVAC control configuration data, etc.) is resident on the mobile device (e.g., in the program code of the App, etc.), the App may be configured to collect high level information from the user. Such information may be collected in the background in accordance with an End User License Agreement (EULA). By way of example, the following information may be collected such as (1) the operating system of the mobile device on which the App is being used; (2) smartphone model on which the App is being used, (3) country in which the App is being used, (4) high level location where the App is being used; (5) App related functionality such as crash, read failure, write failure, read success, write success, etc.; (6) detail controls level information such as control ADCS number, control error codes at the time of installation, control configuration information at the time installation, etc. If Internet is not available, the App's functionality will remain operational but collected data will not be sent until the mobile device is connected to the Internet.

Figure 9:
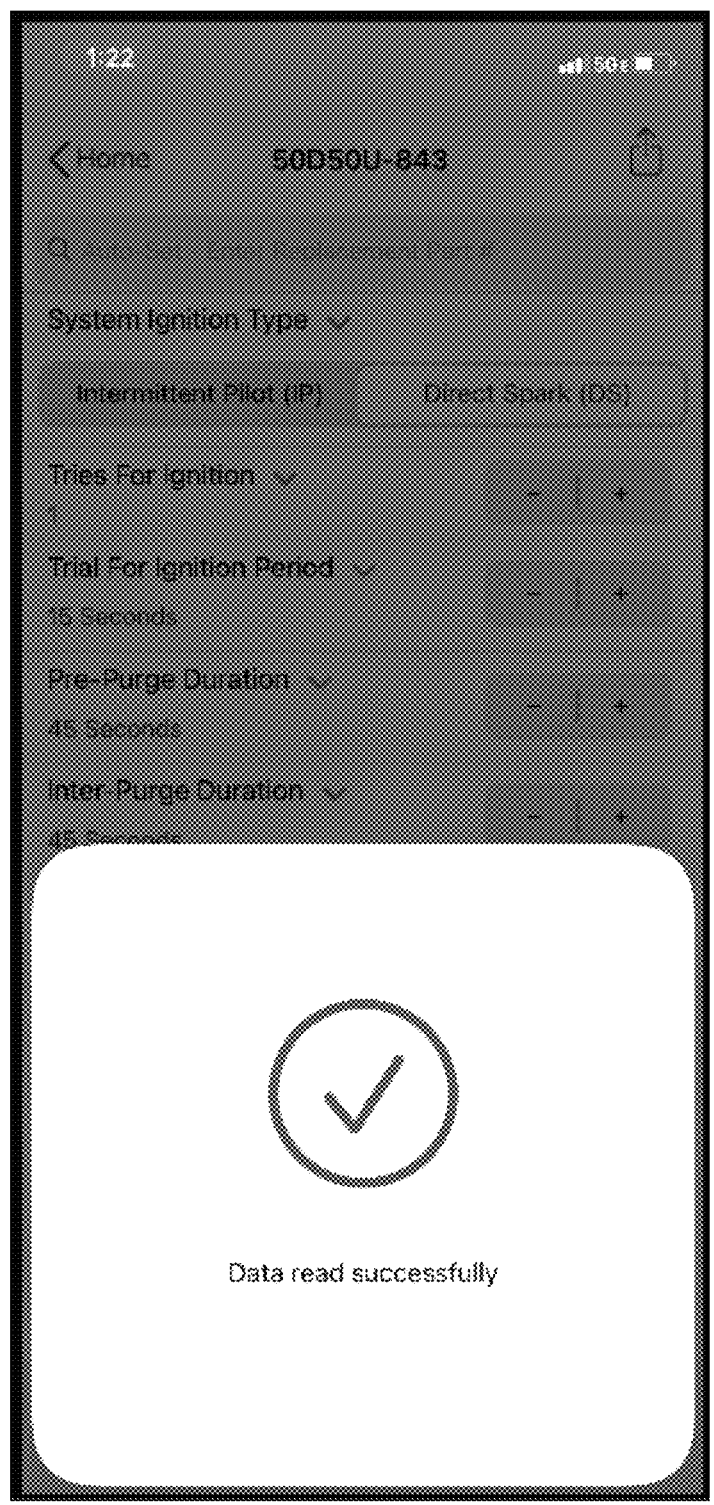
Figure 10:
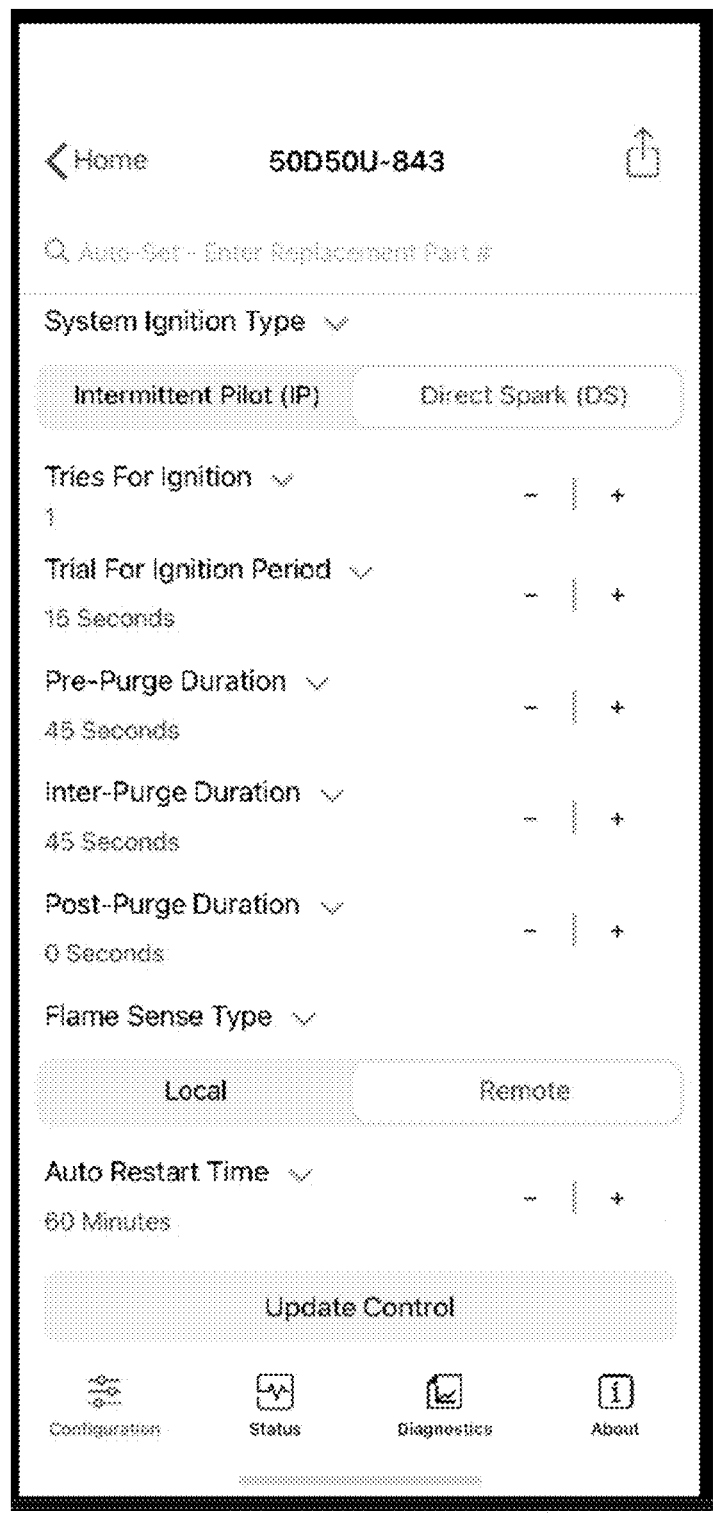

After the initialization is complete, the App then displays a user selectable item "Connect to Control". When a user selects (e.g., by tapping on the touchscreen display, etc.) the "Connect to Control" item, the "Connect to Control" text dims and an NFC scan pop-up is displayed (FIG. 8) instructing the user to place the mobile device on the NFC logo or NFC locator on the HVAC control. After the user successfully places the mobile device in contact with or sufficiently close to the NFC logo or NFC locator on the HVAC control, the App will display a notification to the user that the data read was successful (FIG. 9). The App then uploads information for the HVAC control (e.g., control type along with parameters consistent with that control type) and displays the identified HVAC control, which in this example is 50D50U-843 configured for intermittent pilot (FIG. 10).

Figure 11:
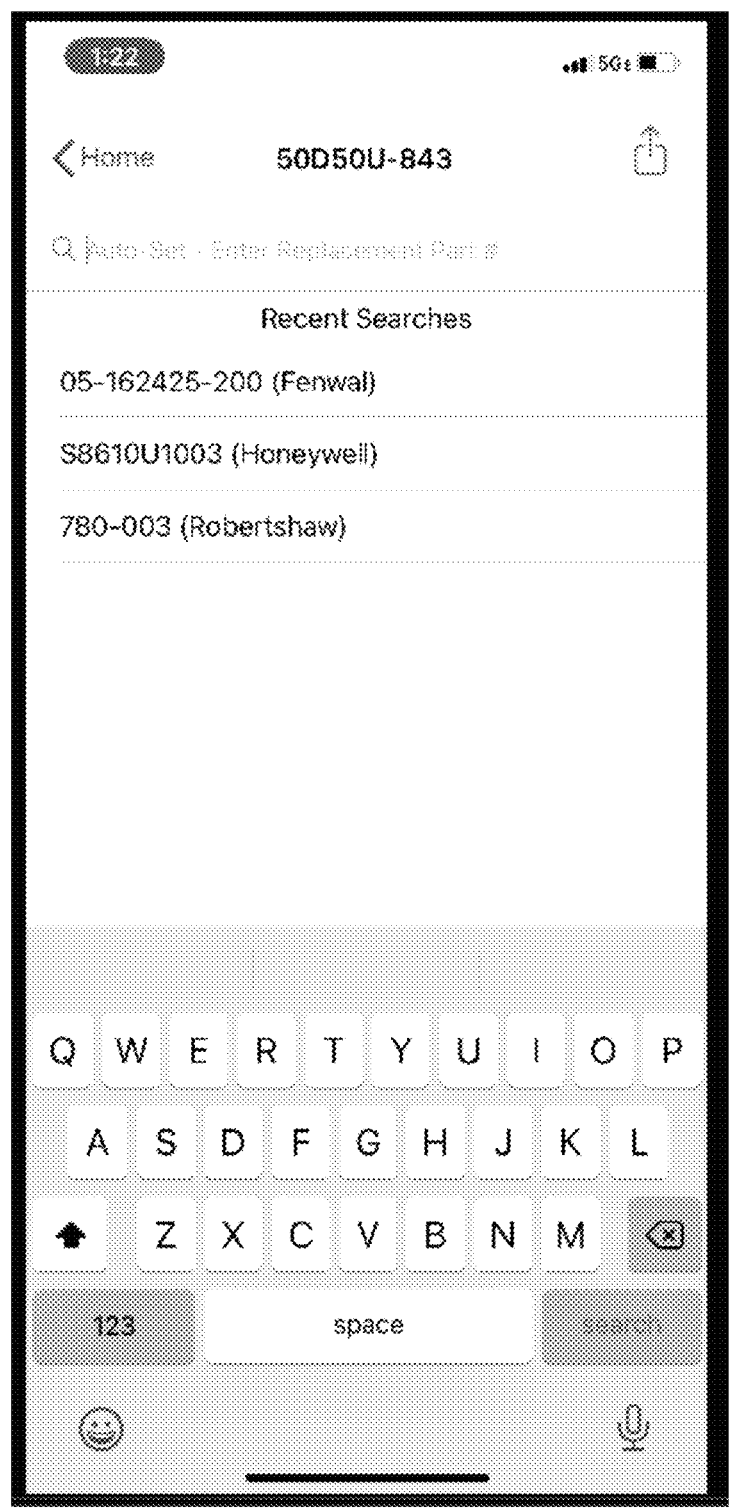
Figure 12:
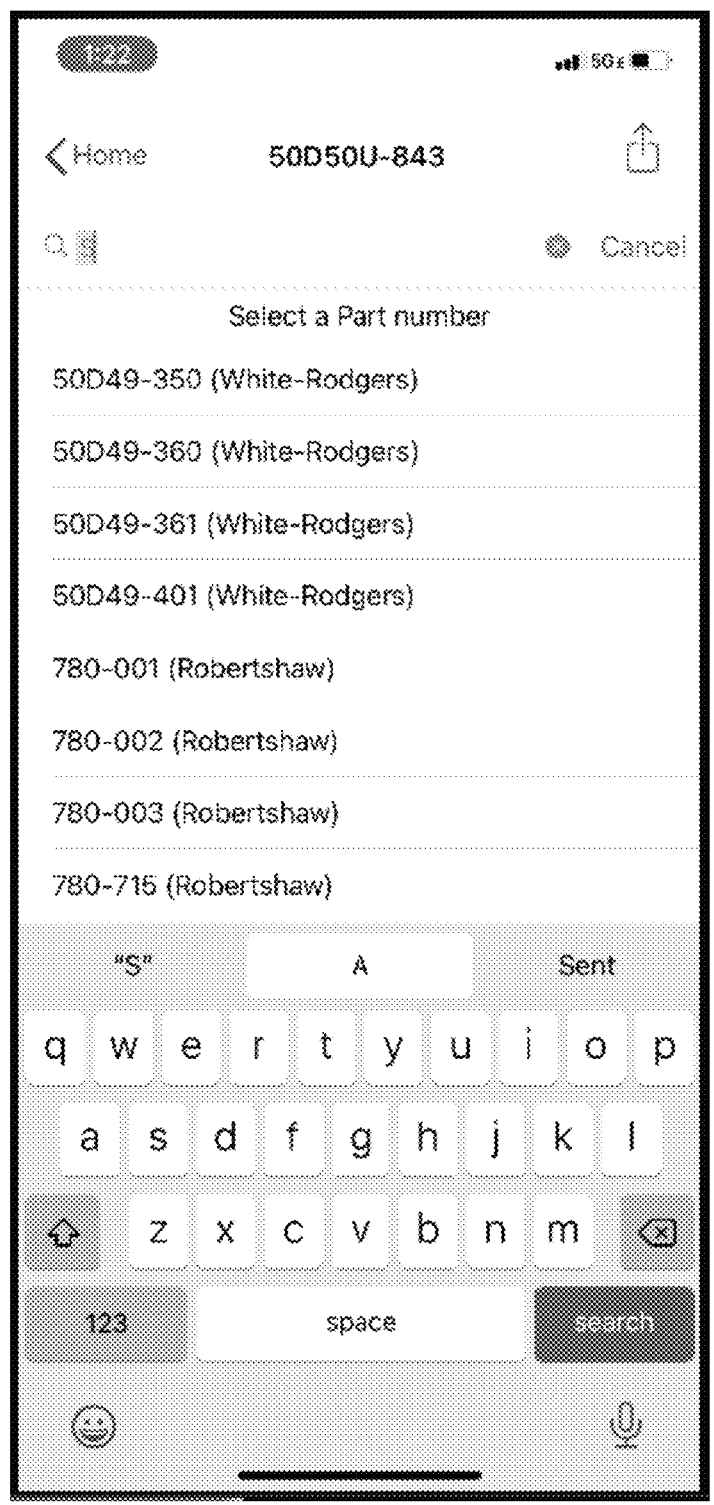
Figure 13:
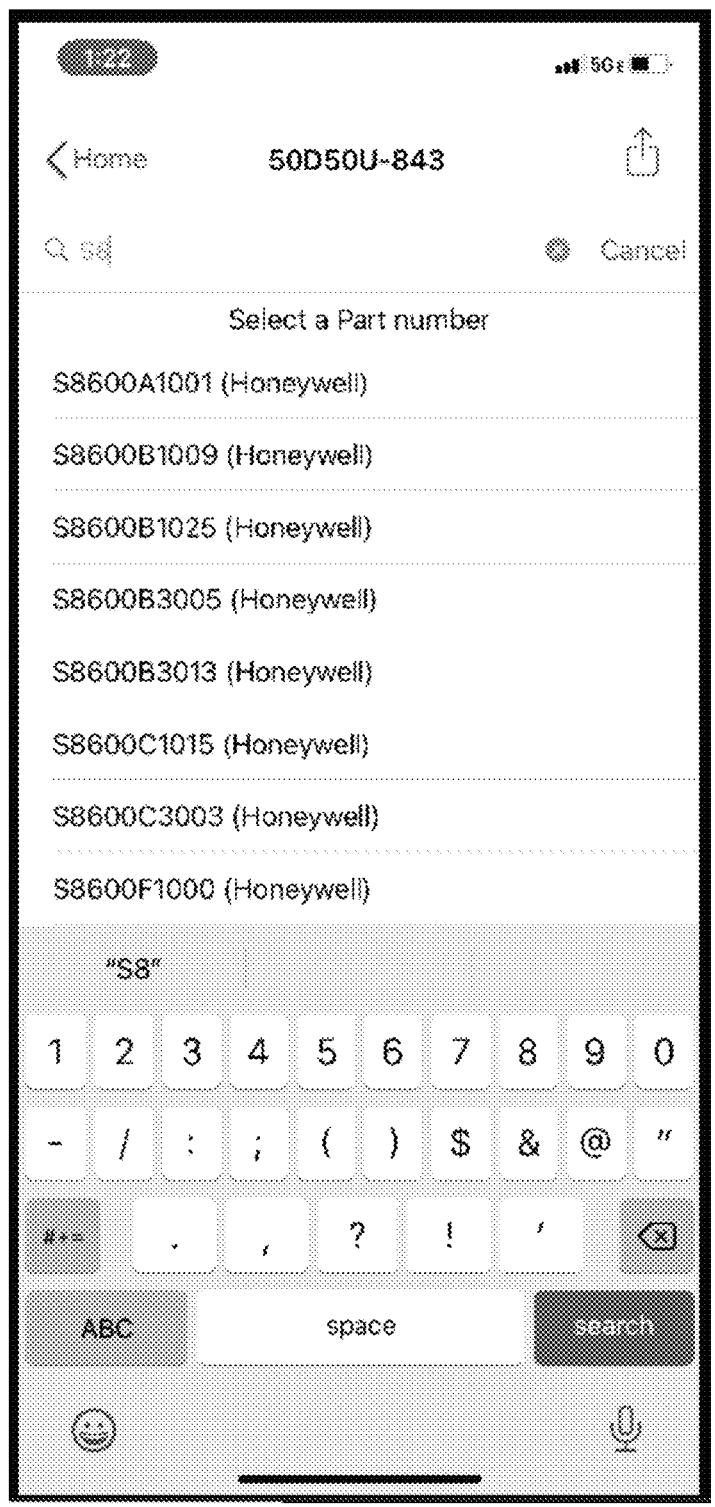
Figure 14:
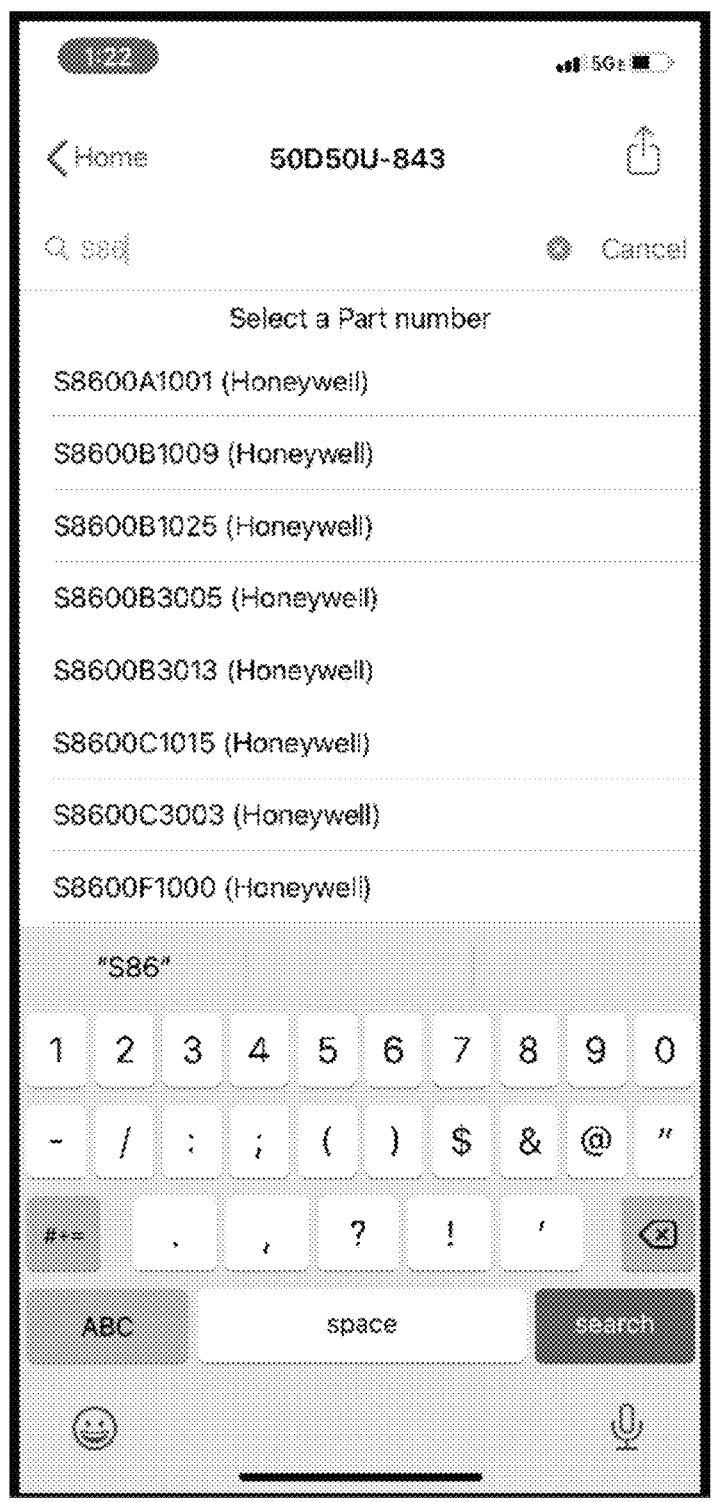

As shown in FIG. 11, a list of the user's recent searches may be displayed. If none of the recent searches are selected by the user, the user may begin to enter the part/model number of the existing HVAC control that is to be replaced, which in this example is a Capable Controls DSI unit. As shown by FIGS. 12-14, the user may type in the part/model number from the HVAC control being replaced. And the App may "drill down" and progressively present a shorter and shorter list of possible choices as the user continues to enter more of the control's part/model number, e.g., S (FIG. 12), S8 (FIG. 13), S86 (FIG. 14), etc.

The App searches for possible choices from the memory of the mobile device that correspond with or correlate to the part/module number (or portion thereof) that has been entered by the user. This search capability provides a relatively quick way for a user to obtain a configuration data set for an HVAC control that is being replaced. Sometimes, the user may not know all of the configuration timings and other configuration settings for a HVAC control to be replaced. Instead, the user may only know the HVAC control's part/model number. Advantageously, the search capability provided by the App may thus allow the user to correctly configure a replacement HVAC control so long as the user at least knows the part/model number of the HVAC control being replaced. The App's search capability may also advantageously reduce human error that may otherwise lead to misconfiguring a replacement HVAC control.

Figure 15:
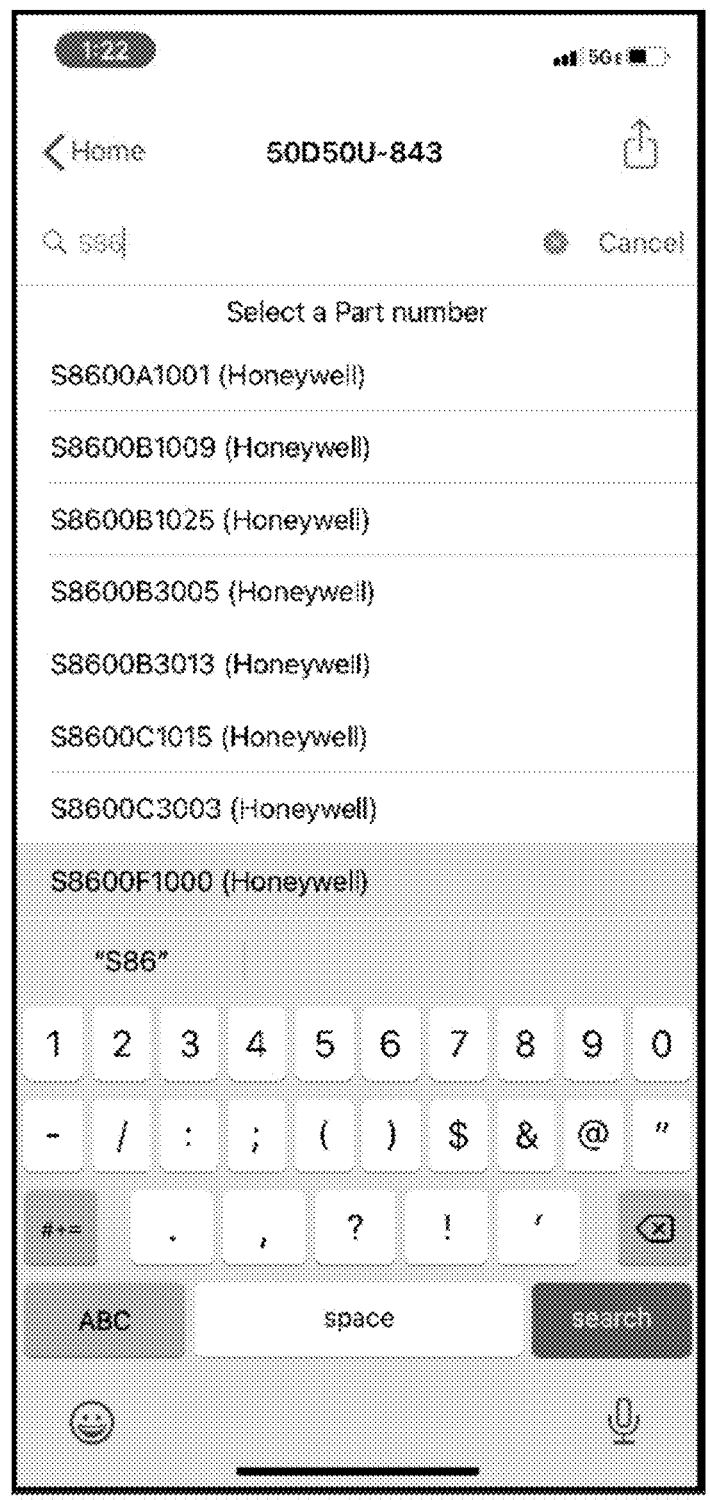
Figure 16:
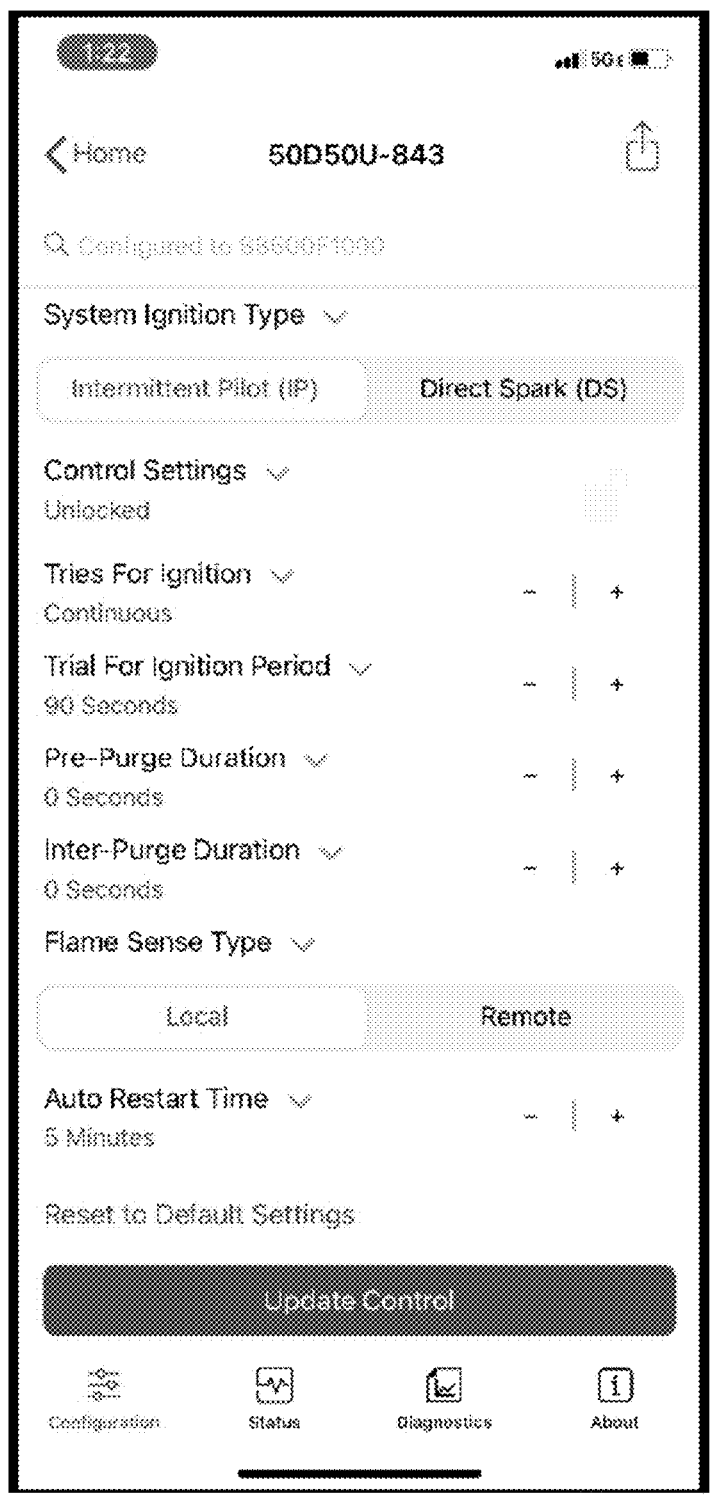
Figure 17:
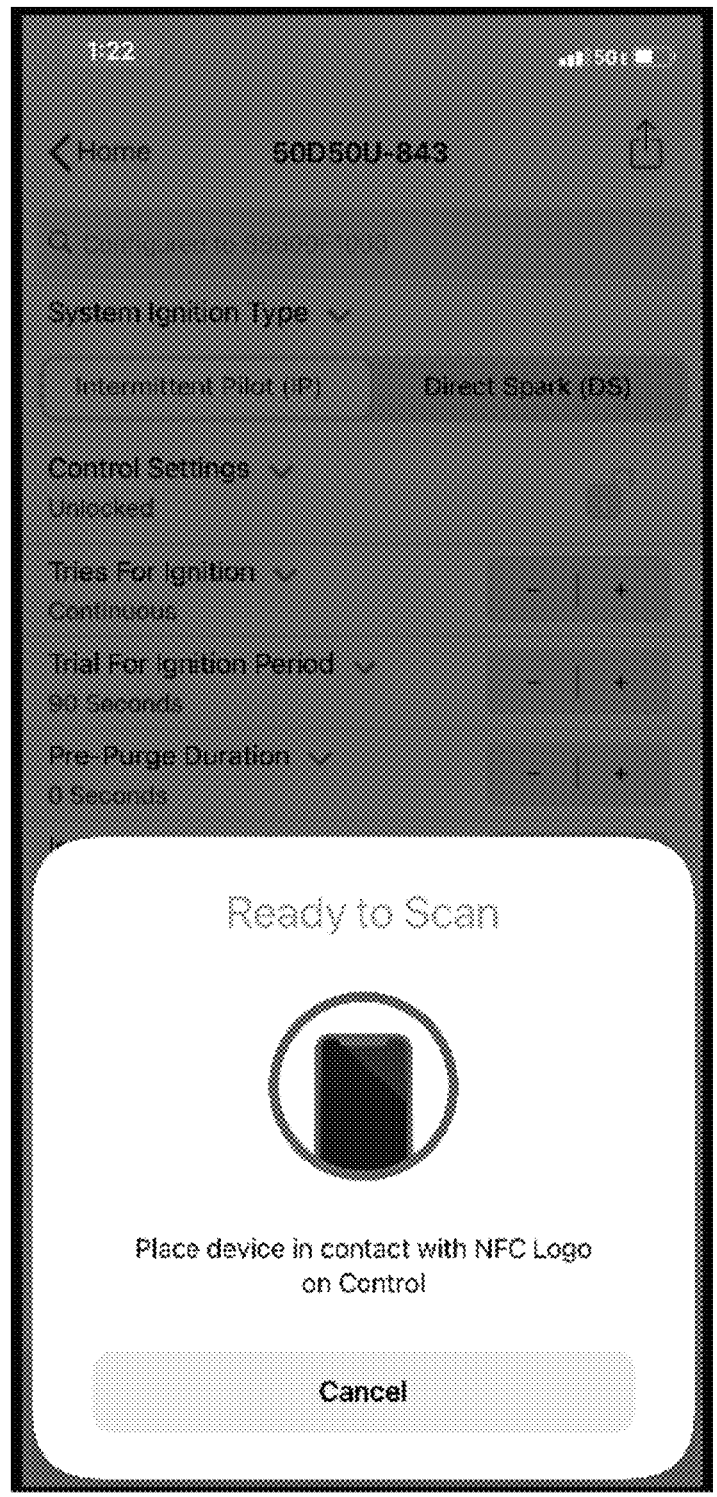
Figure 18:
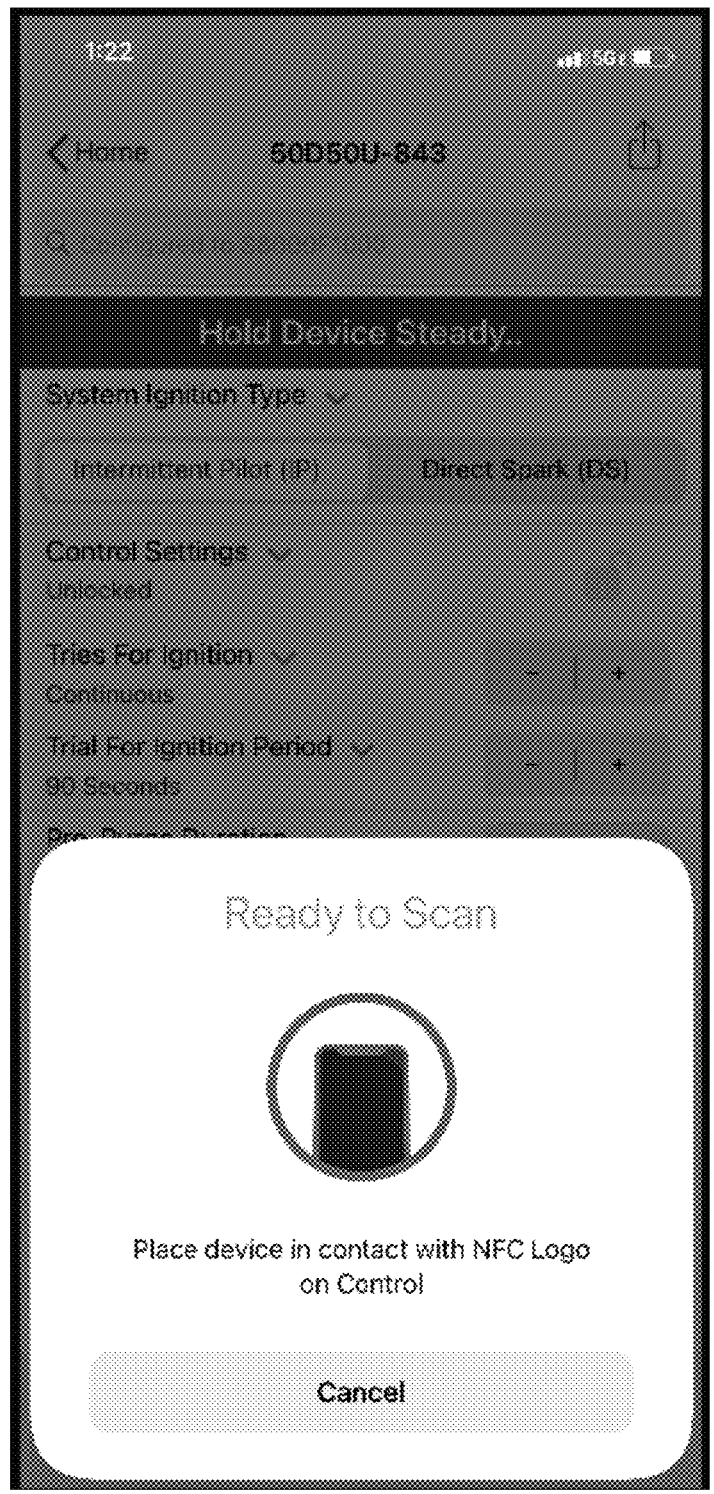
Figure 19:
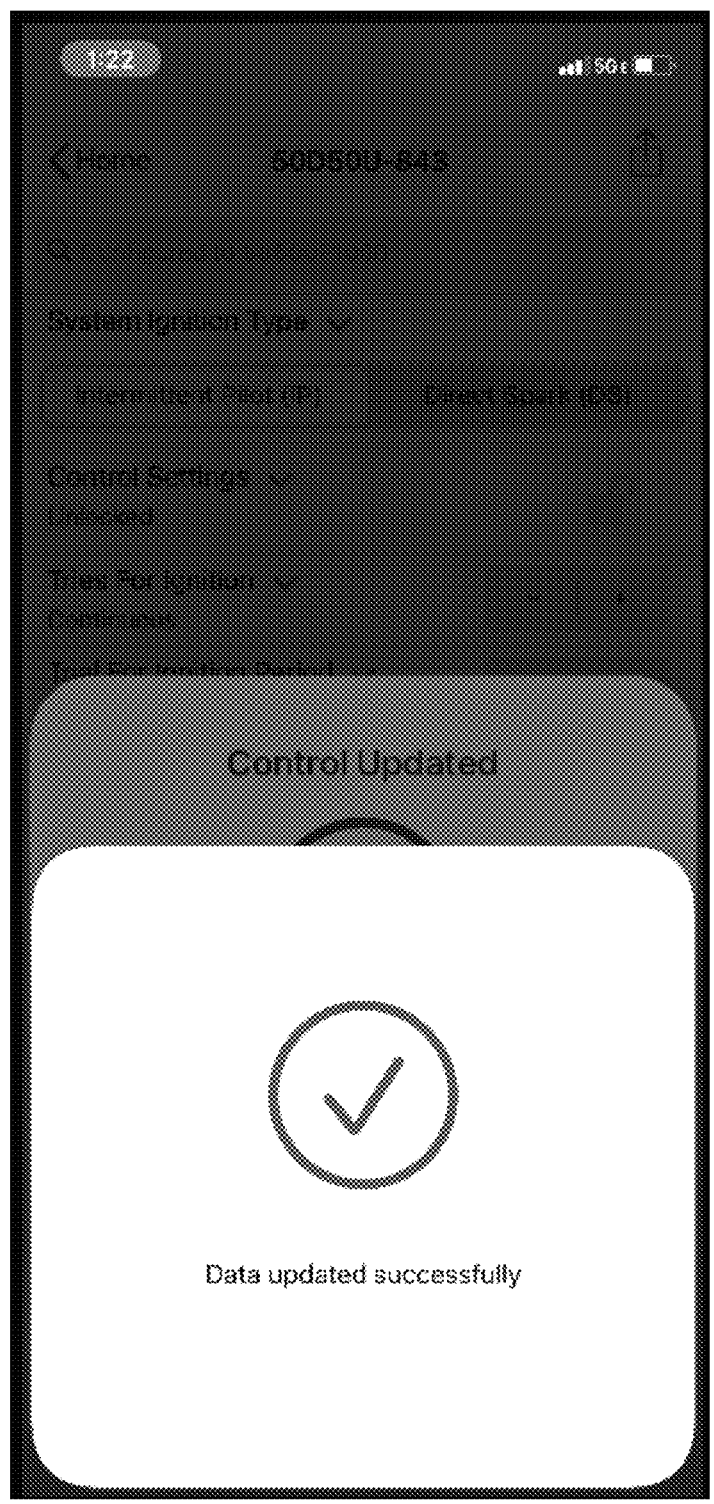

As shown in FIG. 15, the user has selected (e.g., by tapping on the touchscreen display of the mobile device, etc.) one of the controls from the list of options displayed on the mobile device. In response to user's selection, the App changes the information from the uploaded 50D50U-843 configuration (FIG. 10) to the configuration for a Capable Controls DSI (FIG. 16). In alternative embodiments, the user may be able to manipulate one or more settings manually after searching in case the user wants to make any additional changes to the settings of the replacement HVAC control.

Next, the user selects (e.g., by tapping the touchscreen display, etc.) the "Update Control" item (FIG. 16). In response to the user's selection of "Update Control", an NFC scan pop-up is displayed (FIG. 17) instructing the user to place the mobile device on the NFC logo or NFC locator on the replacement HVAC control. The user may be instructed to hold the mobile device steady (FIG. 18) as the replacement HVAC control is being updated. The user may then be notified (FIG. 19) when the data has been successfully updated to the replacement HVAC control.

As noted above, the App is configured to progressively present a shorter and shorter list of possible choices that correspond or correlate with the user's continued entry of the control's part/model number. In exemplary embodiments, the App is configured to only allow the user to select part/model numbers that are included in the internal list of valid replacement part/model numbers stored in the memory of the mobile device. If a user searches for a part/model number outside of the internal list of valid replacement part/model numbers, the App is configured to notify or alert the user of the wrong or incorrect control type. For example, the App may alert the user if the user selected an ignition control but incorrectly began entering a part/model number for a defrost control.

In another exemplary embodiment, the App is configured to allow the user to search a part/model number before scanning a control. In this example, the App is configured to allow user selection of any part/model number that is replaceable by an NFC-enabled control. When the user scans the control with the selected part/model number, the App is configured to perform a compatibility check based of the control type scanned and the part/model number selected. If the compatibility check fails, the data read or write will not be allowed, and a message will be displayed to notify the user of the failed compatibility check.

In exemplary embodiments, the App is configured to be operable with non-integrated ignition modules for spark ignition including both Intermittent Pilot (IP) and Direct Spark (DS) system ignition types as shown in FIGS. 10 and 16. In additional exemplary embodiments, the App is configured to also be operable with integrated single stage furnace controls.

In exemplary embodiments, a system comprises a mobile device (e.g., a smartphone, etc.) including a user interface, a memory, and a mobile wireless interface. The mobile device is configured to receive and/or determine a first identifier of the first HVAC control and to automatically configure one or more first settings for the first HVAC control corresponding with the first identifier. The one or more first settings are stored within and retrievable directly from the memory of the mobile device. The one or more first settings may be displayed on the user interface. The mobile device is also configured to receive and/or determine a second identifier of the second HVAC control and to automatically configure one or more second settings for the second HVAC control corresponding with the second identifier. The one or more second settings may be displayed on the user interface. The one or more second settings are stored within and retrievable directly from the memory of the mobile device. The mobile device is also configured to wirelessly transmit, via the mobile wireless interface, the one or more second settings from the memory of the mobile device to the second HVAC control for download to a memory of the second HVAC control for controlling at least one HVAC component according to the one or more second settings.

In exemplary embodiments, the mobile device is configured to receive a user entry, via the user interface, of at least a portion of the second identifier of the second HVAC control; display, on the user interface, a list of possible HVAC controls that correspond with the at least a portion of the second identifier of the second HVAC control entered by the user; and allow the user to select the second HVAC control from the list of possible HVAC controls displayed on the user interface. The mobile device is also configured to display a progressively shorter list of the possible HVAC controls for selection by the user as the user continues to enter more of the second identifier of the second HVAC control.

In exemplary embodiments, the mobile device is configured to receive a user selection of the second identifier of the second HVAC control from a list of HVAC control identifiers displayed on the user interface; and automatically configure the one or more second settings for the second HVAC control that corresponds with the user selection of the second identifier of the second HVAC control from the list of HVAC control identifiers, the list of HVAC control identifiers and settings for the HVAC controls identified in the list of HVAC control identifiers stored within and retrievable from the memory of the mobile device. The mobile device is also configured such that the list of HVAC control identifiers and the settings for the HVAC controls identified in the list of HVAC control identifiers are stored within and retrievable from the memory of the mobile device without retrieving the list of HVAC control identifiers and the settings from a remote server or cloud.

In exemplary embodiments, the mobile device is configured such that the one or more first settings for the first HVAC control and the one or more second settings for the second HVAC control are stored within and retrievable directly from the memory of the mobile device without retrieving the one or more first settings for the first HVAC control and the one or more second settings for the second HVAC control from a remote server or cloud.

In exemplary embodiments, the system includes the second HVAC control, which is configured to control at least one HVAC component according to one or more HVAC system configuration parameters. The second HVAC control is configured to download and store the one or more second settings wirelessly received from the mobile wireless interface in a memory of the second HVAC control for use as the one or more HVAC system configuration parameters when controlling at least one HVAC component.

In exemplary embodiments, the mobile device is configured to configured to determine the first identifier of the first HVAC control by parsing an image of a label of the first HVAC control as captured by a camera, or by the mobile device receiving the first identifier of the first HVAC control entered into the user interface, or by the first HVAC control wirelessly transmitting the first identifier of the first HVAC control to the mobile wireless interface of the mobile device.

In exemplary embodiments, the mobile device is configured to determine the second identifier of the second HVAC control by parsing an image of a label of the second HVAC control as captured by a camera, or by the mobile device receiving the second identifier of the second HVAC control entered into the user interface, or by the second HVAC control wirelessly transmitting the second identifier of the second HVAC control to the mobile wireless interface of the mobile device.

In exemplary embodiments, the mobile device is configured to receive one or more adjustments, via the user interface, to the one or more second settings for the second HVAC control; and wirelessly transmit, via the mobile wireless interface, the adjusted setting(s) to the second HVAC control for download to the memory of the second HVAC control for controlling at least one HVAC component according to the adjusted setting(s).

In exemplary embodiments, the mobile wireless interface of the mobile device comprises a Near Field Communication (NFC) short-range wireless communication interface. The system includes the first HVAC control, which comprises a Near Field Communication (NFC) short-range wireless communication interface. The system includes the second HVAC control, which comprises a Near Field Communication (NFC) short-range wireless communication interface.

In exemplary embodiments, the mobile device is configured to receive and/or determine the first identifier of the first HVAC control by scanning, via the mobile device, a first NFC locator on the first HVAC control when the mobile device is placed in contact with or close proximity to first NFC locator on the first HVAC control such that the NFC short-range wireless communication interface of the mobile device is in wireless communication with the NFC short-range wireless communication interface of the first HVAC control. The mobile device is also configured to wirelessly transmit the one or more second settings for the second HVAC control from the memory of the mobile device to the second HVAC control after the mobile device scans a second NFC locator on the second HVAC control when the mobile device is placed in contact with or close proximity to the second NFC locator on the second HVAC control such that the NFC short-range wireless communication interface of the mobile device is in wireless communication with the NFC short-range wireless communication interface of the second HVAC control.

In exemplary embodiments, the mobile device is configured to allow the user to search for and select, via the user interface, the second identifier of the second HVAC control before scanning the first NFC locator on the first HVAC control; perform a compatibility check after scanning the first NFC locator on the first HVAC control to determine compatibility of the second HVAC control as a replacement for the first HVAC control; and if the compatibility check fails, disallow the wireless transmission of the one or more second settings from the memory of the mobile device to the second HVAC control and notify the user of the failed compatibility check.

Also disclosed are methods of configuring one or more settings for a replacement HVAC control for controlling at least one HVAC component according to the one or more settings. In exemplary embodiments, the method comprises receiving and/or determining a first identifier of a first HVAC control; automatically configuring one or more first settings for the first HVAC control corresponding with the first identifier, the one or more first settings stored within and retrievable directly from a memory of a mobile device (e.g., a smartphone, etc.); displaying the one or more first settings on a user interface of the mobile device; receiving and/or determining a second identifier of a second HVAC control; automatically configuring one or more second settings for the second HVAC control corresponding with the second identifier, the one or more second settings stored within and retrievable directly from the memory of the mobile device; displaying the one or more second settings on the user interface of the mobile device; and wirelessly transmitting the one or more second settings from the memory of the mobile device to the second HVAC control for download to a memory of the second HVAC control for controlling at least one HVAC component according to the one or more second settings.

In exemplary embodiments, the method includes receiving a user entry, via the user interface, of at least a portion of the second identifier of the second HVAC control; displaying, on the user interface, a list of possible HVAC controls that correspond with the at least a portion of the second identifier of the second HVAC control entered by the user; and allowing the user to select the second HVAC control from the list of possible HVAC controls displayed on the user interface. The method also includes displaying, on the user interface, a progressively shorter list of the possible HVAC controls for selection by the user as the user continues to enter more of the second identifier of the second HVAC control.

In exemplary embodiments, the method includes retrieving the one or more first settings for the first HVAC control and the one or more second settings for the second HVAC control directly from the memory of the mobile device without retrieving the one or more first settings for the first HVAC control and the one or more second settings for the second HVAC control from a remote server or cloud.

In exemplary embodiments, the method includes determining the first identifier of the first HVAC control by parsing an image of a label of the first HVAC control as captured by a camera, or by the mobile device receiving the first identifier of the first HVAC control entered into the user interface, or by the first HVAC control wirelessly transmitting the first identifier of the first HVAC control to the mobile device. The method also includes determining the second identifier of the second HVAC control by parsing an image of a label of the second HVAC control as captured by a camera, or by the mobile device receiving the second identifier of the second HVAC control entered into the user interface, or by the second HVAC control wirelessly transmitting the second identifier of the second HVAC control to the mobile device.

In exemplary embodiments, the method includes receiving one or more adjustments, via the user interface, to the one or more second settings for the second HVAC control; and wirelessly transmitting the adjusted setting(s) from the mobile device to the second HVAC control for download to the memory of the second HVAC control for controlling at least one HVAC component according to the adjusted setting(s).

In exemplary embodiments, the mobile device includes a Near Field Communication (NFC) short-range wireless communication interface. The first HVAC control includes a Near Field Communication (NFC) short-range wireless communication interface. The second HVAC control includes a Near Field Communication (NFC) short-range wireless communication interface. And the method includes receiving and/or determining the first identifier of the first HVAC control by scanning, via the mobile device, a first NFC locator on the first HVAC control after placing the mobile device in contact with or close proximity to first NFC locator on the first HVAC control such that the NFC short-range wireless communication interface of the mobile device is in wireless communication with the NFC short-range wireless communication interface of the first HVAC control. The method also includes wirelessly transmitting the one or more second settings for the second HVAC control from the memory of the mobile device to the second HVAC control after scanning, via the mobile device, a second NFC locator on the second HVAC control when the mobile device is placed in contact with or close proximity to the second NFC locator on the second HVAC control such that the NFC short-range wireless communication interface of the mobile device is in wireless communication with the NFC short-range wireless communication interface of the replacement HVAC control.

In exemplary embodiments, the method includes allowing the user to search for and select, via the user interface, the second identifier of the second HVAC control before scanning the first NFC locator on the first HVAC control; performing a compatibility check after scanning the first NFC locator on the first HVAC control to determine compatibility of the second HVAC control as a replacement for the first HVAC control; and if the compatibility check fails, disallowing the wireless transmission of the one or more second settings from the memory of the mobile device to the second HVAC control and notifying the user of the failed compatibility check.

In exemplary embodiments, a mobile device configured to perform a method as disclosed herein for configuring one or more settings for a replacement HVAC control for controlling at least one HVAC component according to the one or more settings.

In exemplary embodiments, a non-transitory computer-readable storage media comprises computer-executable instructions, which when executed by at least one processor, cause the at least one processor to be operable for receiving and/or determining a first identifier of a first HVAC control; automatically configuring one or more first settings for the first HVAC control corresponding with the first identifier; displaying the one or more first settings on a user interface of a mobile device (e.g., a smartphone, etc.); receiving and/or determining a second identifier of a second HVAC control; automatically configuring one or more second settings for the second HVAC control corresponding with the second identifier; displaying the one or more second settings on the user interface of the mobile device; and wirelessly transmitting the one or more second settings from the memory of the mobile device to the second HVAC control for download to a memory of the second HVAC control for controlling at least one HVAC component according to the one or more second settings. The one or more first settings are stored within and retrievable directly from a memory of a mobile device. The one or more second settings are stored within and retrievable directly from the memory of the mobile device.

In exemplary embodiments, the computer-executable instructions include computer-executable instructions, which when executed by at least one processor, cause the at least one processor to be operable for receiving a user entry, via the user interface, of at least a portion of the second identifier of the second HVAC control; displaying, on the user interface, a list of possible HVAC controls that correspond with the at least a portion of the second identifier of the second HVAC control entered by the user; and allowing the user to select the second HVAC control from the list of possible HVAC controls displayed on the user interface.

In exemplary embodiments, the computer-executable instructions include computer-executable instructions, which when executed by at least one processor, cause the at least one processor to be operable for displaying, on the user interface, a progressively shorter list of the possible HVAC controls for selection by the user as the user continues to enter more of the second identifier of the second HVAC control.

In exemplary embodiments, the computer-executable instructions include computer-executable instructions, which when executed by at least one processor, cause the at least one processor to be operable for retrieving the one or more first settings for the first HVAC control and the one or more second settings for the second HVAC control directly from the memory of the mobile device without retrieving the one or more first settings for the first HVAC control and the one or more second settings for the second HVAC control from a remote server or cloud.

In exemplary embodiments, a mobile device comprises the non-transitory computer-readable storage media disclosed herein.

In exemplary embodiments, a system comprises a mobile device including a user interface, a memory, and a mobile wireless interface. The mobile device is configured to receive and/or determine an identifier of an HVAC control, and automatically configure one or more settings for the HVAC control corresponding with the identifier. The one or more settings are stored within and retrievable directly from the memory of the mobile device. The mobile device is also configured to display the one or more settings for the HVAC control on the user interface, and wirelessly transmit, via the mobile wireless interface, the one or more settings from the memory of the mobile device to the HVAC control for download to a memory of the HVAC control for controlling at least one HVAC component according to the one or more settings.

In exemplary embodiments, the mobile device is configured to receive a user entry, via the user interface, of at least a portion of the identifier of the HVAC control; display, on the user interface, a list of possible HVAC controls that correspond with the at least a portion of the identifier of the HVAC control entered by the user; and allow the user to select the HVAC control from the list of possible HVAC controls displayed on the user interface. The mobile device is also configured to display a progressively shorter list of the possible HVAC controls for selection by the user as the user continues to enter more of the identifier of the HVAC control.

In exemplary embodiments, the mobile device is configured to receive a user selection, via the user interface, of the identifier of the HVAC control from a list of HVAC control identifiers displayed on the user interface; and automatically configure the one or more settings for the HVAC control that corresponds with the user selection of the identifier of the HVAC control from the list of HVAC control identifiers, the list of HVAC control identifiers and settings for the HVAC controls identified in the list of HVAC control identifiers stored within and retrievable from the memory of the mobile device. The mobile device is also configured such that the list of HVAC control identifiers and the settings for the HVAC controls identified in the list of HVAC control identifiers are stored within and retrievable from the memory of the mobile device without retrieving the list of HVAC control identifiers and the settings from a remote server or cloud.

In exemplary embodiments, the mobile device is configured such that the one or more settings for the HVAC control are stored within and retrievable directly from the memory of the mobile device without retrieving the one or more settings for the HVAC control from a remote server or cloud.

In exemplary embodiments, the system includes the HVAC control, which is configured to control at least one HVAC component according to one or more HVAC system configuration parameters. The HVAC control is configured to download and store the one or more settings wirelessly received from the mobile wireless interface in the memory of the HVAC control for use as the one or more HVAC system configuration parameters when controlling at least one HVAC component.

In exemplary embodiments, the mobile device is configured to determine the identifier of the HVAC control by parsing an image of a label of the HVAC control as captured by a camera, or by the mobile device receiving the identifier of the HVAC control entered into the user interface, or by the HVAC control wirelessly transmitting the identifier of the HVAC control to the mobile wireless interface of the mobile device.

In exemplary embodiments, the mobile device is configured to receive one or more adjustments, via the user interface, to the one or more settings for the HVAC control; and wirelessly transmit, via the mobile wireless interface, the adjusted setting(s) to the HVAC control for download to the memory of the HVAC control for controlling at least one HVAC component according to the adjusted setting(s).

In exemplary embodiments, the mobile wireless interface of the mobile device comprises a Near Field Communication (NFC) short-range wireless communication interface. The system includes the HVAC control, which comprises a Near Field Communication (NFC) short-range wireless communication interface.

In exemplary embodiments, the mobile device is configured to receive and/or determine the identifier of the HVAC control by scanning, via the mobile device, an NFC locator on the HVAC control when the mobile device is placed in contact with or close proximity to NFC locator on the HVAC control such that the NFC short-range wireless communication interface of the mobile device is in wireless communication with the NFC short-range wireless communication interface of the HVAC control.

In exemplary embodiments, the mobile device is configured to allow the user to search for and select, via the user interface, an identifier of a replacement HVAC control before scanning the NFC locator on the HVAC control; perform a compatibility check after scanning the NFC locator on the HVAC control to determine compatibility of the selected replacement HVAC control as a replacement for the HVAC control that was scanned; and if the compatibility check fails, disallow the wireless transmission of the one or more settings from the memory of the mobile device to the replacement HVAC control and notify the user of the failed compatibility check.

In exemplary embodiments, the system is configured to be operable with ignition modules for spark ignition. And the one or more settings include intermittent pilot or direct spark system ignition type, number of tries for ignition, trial for ignition period, pre-purge duration, inter-purge duration, post-purge duration, local or remote flame sense type, and auto restart time.

In exemplary embodiments, the system includes a first HVAC control and a replacement HVAC control for the first HVAC control. The mobile device is configured to receive and/or determine a first identifier of the first HVAC control; automatically configure one or more settings for the first HVAC control corresponding with the first identifier, the one or more settings for the first HVAC control stored within and retrievable directly from the memory of the mobile device; display the one or more settings for the first HVAC control on the user interface; receive and/or determine a second identifier of the replacement HVAC control; automatically configure one or more settings for the replacement HVAC control corresponding with the second identifier, the one or more settings for the replacement HVAC control stored within and retrievable directly from the memory of the mobile device; display the one or more settings for the replacement HVAC control on the user interface; and wirelessly transmit, via the mobile wireless interface, the one or more settings for the replacement HVAC control from the memory of the mobile device to the replacement HVAC control for download to a memory of the replacement HVAC control for controlling at least one HVAC component according to the one or settings for the replacement HVAC control.

In exemplary embodiments, the first HVAC control comprises a Near Field Communication (NFC) short-range wireless communication interface. The replacement HVAC control comprises a Near Field Communication (NFC) short-range wireless communication interface. The mobile wireless interface of the mobile device comprises a Near Field Communication (NFC) short-range wireless communication interface. The mobile device is configured to receive and/or determine the first identifier of the first HVAC control by scanning, via the mobile device, a first NFC locator on the first HVAC control when the mobile device is placed in contact with or close proximity to first NFC locator on the first HVAC control such that the NFC short-range wireless communication interface of the mobile device is in wireless communication with the NFC short-range wireless communication interface of the first HVAC control. The mobile device is also configured to wirelessly transmit the one or more settings for the replacement HVAC control from the memory of the mobile device to the replacement HVAC control after the mobile device scans a second NFC locator on the replacement HVAC control when the mobile device is placed in contact with or close proximity to the second NFC locator on the replacement HVAC control such that the NFC short-range wireless communication interface of the mobile device is in wireless communication with the NFC short-range wireless communication interface of the replacement HVAC control.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising a mobile device including a user interface, a memory, and a mobile wireless interface, wherein the mobile device is configured to:
   receive and/or determine a first identifier of a first HVAC control;
   automatically configure one or more first settings for the first HVAC control corresponding with the first identifier, the one or more first settings stored within and retrievable directly from the memory of the mobile device;
   display the one or more first settings on the user interface;
   receive a user entry, via the user interface, of at least a portion of a second identifier of a second HVAC control;

display, on the user interface, a list of possible HVAC controls that correspond with the at least a portion of the second identifier of the second HVAC control entered by the user;

allow the user to select the second HVAC control from the list of possible HVAC controls displayed on the user interface;

automatically configure one or more second settings for the second HVAC control corresponding with the second identifier, the one or more second settings stored within and retrievable directly from the memory of the mobile device;

display the one or more second settings on the user interface; and wirelessly transmit, via the mobile wireless interface, the one or more second settings from the memory of the mobile device to the second HVAC control for download to a memory of the second HVAC control for controlling at least one HVAC component according to the one or more second settings;

wherein the mobile device is configured such that the one or more first settings for the first HVAC control and the one or more second settings for the second HVAC control are stored within and retrievable directly from the memory of the mobile device without retrieving the one or more first settings for the first HVAC control and the one or more second settings for the second HVAC control from a remote server or cloud.

2. The system of claim 1, wherein the mobile device is configured to display a progressively shorter list of the possible HVAC controls for selection by the user as the user continues to enter more of the second identifier of the second HVAC control.

3. The system of claim 1, wherein the mobile device is configured to:

receive a user selection of the second identifier of the second HVAC control from a list of HVAC control identifiers displayed on the user interface; and automatically configure the one or more second settings for the second HVAC control that corresponds with the user selection of the second identifier of the second HVAC control from the list of HVAC control identifiers, the list of HVAC control identifiers and settings for the HVAC controls identified in the list of HVAC control identifiers stored within and retrievable from the memory of the mobile device.

4. The system of claim 3, wherein the mobile device is configured such that the list of HVAC control identifiers and the settings for the HVAC controls identified in the list of HVAC control identifiers are stored within and retrievable from the memory of the mobile device without retrieving the list of HVAC control identifiers and the settings from a remote server or cloud.

5. The system of claim 1, wherein:

the system includes the second HVAC control, which is configured to control at least one HVAC component according to one or more HVAC system configuration parameters; and the second HVAC control is configured to download and store the one or more second settings wirelessly received from the mobile wireless interface in a memory of the second HVAC control for use as the one or more HVAC system configuration parameters when controlling at least one HVAC component.

6. The system of claim 1, wherein:

the mobile device is configured to determine the first identifier of the first HVAC control by parsing an image of a label of the first HVAC control as captured by a camera, or by the mobile device receiving the first identifier of the first HVAC control entered into the user interface, or by the first HVAC control wirelessly transmitting the first identifier of the first HVAC control to the mobile wireless interface of the mobile device; and/or the mobile device is configured to determine the second identifier of the second HVAC control by parsing an image of a label of the second HVAC control as captured by a camera, or by the mobile device receiving the second identifier of the second HVAC control entered into the user interface, or by the second HVAC control wirelessly transmitting the second identifier of the second HVAC control to the mobile wireless interface of the mobile device.

7. The system of claim 1, wherein the mobile device is configured to:

receive one or more adjustments, via the user interface, to the one or more second settings for the second HVAC control; and wirelessly transmit, via the mobile wireless interface, the adjusted setting(s) to the second HVAC control for download to the memory of the second HVAC control for controlling at least one HVAC component according to the adjusted setting(s).

8. The system of claim 1, wherein:

the mobile wireless interface of the mobile device comprises a Near Field Communication (NFC) short-range wireless communication interface;

the system includes the first HVAC control, which comprises a Near Field Communication (NFC) short-range wireless communication interface; and the system includes the second HVAC control, which comprises a Near Field Communication (NFC) short-range wireless communication interface.

9. The system of claim 8, wherein:

the mobile device is configured to receive and/or determine the first identifier of the first HVAC control by scanning, via the mobile device, a first NFC locator on the first HVAC control when the mobile device is placed in contact with or close proximity to first NFC locator on the first HVAC control such that the NFC short-range wireless communication interface of the mobile device is in wireless communication with the NFC short-range wireless communication interface of the first HVAC control; and the mobile device is configured to wirelessly transmit the one or more second settings for the second HVAC control from the memory of the mobile device to the second HVAC control after the mobile device scans a second NFC locator on the second HVAC control when the mobile device is placed in contact with or close proximity to the second NFC locator on the second HVAC control such that the NFC short-range wireless communication interface of the mobile device is in wireless communication with the NFC short-range wireless communication interface of the second HVAC control.

10. The system of claim 9, wherein the mobile device is configured to:

allow the user to search for and select, via the user interface, the second identifier of the second HVAC control before scanning the first NFC locator on the first HVAC control;

perform a compatibility check after scanning the first NFC locator on the first HVAC control to determine compatibility of the second HVAC control as a replacement for the first HVAC control; and if the compatibility check fails, disallow the wireless transmission of the one or more second settings from the memory of the mobile device to the second HVAC control and notify the user of the failed compatibility check.

11. A method of configuring one or more settings for a replacement HVAC control for controlling at least one HVAC component according to the one or more settings, the method comprising:

receiving and/or determining a first identifier of a first HVAC control;

automatically configuring one or more first settings for the first HVAC control corresponding with the first identifier, the one or more first settings stored within and retrievable directly from a memory of a mobile device;

displaying the one or more first settings on a user interface of the mobile device;

receiving a user entry, via the user interface, of at least a portion of the second identifier of the second HVAC control;

displaying, on the user interface, a list of possible HVAC controls that correspond with the at least a portion of the second identifier of the second HVAC control entered by the user;

allowing the user to select the second HVAC control from the list of possible HVAC controls displayed on the user interface;

automatically configuring one or more second settings for the second HVAC control corresponding with the second identifier, the one or more second settings stored within and retrievable directly from the memory of the mobile device;

displaying the one or more second settings on the user interface of the mobile device; and wirelessly transmitting the one or more second settings from the memory of the mobile device to the second HVAC control for download to a memory of the second HVAC control for controlling at least one HVAC component according to the one or more second settings;

wherein the one or more first settings for the first HVAC control and the one or more second settings for the second HVAC control are retrieved directly from the memory of the mobile device without retrieving the one or more first settings for the first HVAC control and the one or more second settings for the second HVAC control from a remote server or cloud.

12. The method of claim 11, wherein the method includes displaying, on the user interface, a progressively shorter list of the possible HVAC controls for selection by the user as the user continues to enter more of the second identifier of the second HVAC control.

13. The method of claim 11, wherein the method includes:
determining the first identifier of the first HVAC control by parsing an image of a label of the first HVAC control as captured by a camera, or by the mobile device receiving the first identifier of the first HVAC control entered into the user interface, or by the first HVAC control wirelessly transmitting the first identifier of the first HVAC control to the mobile device; and/or
determining the second identifier of the second HVAC control by parsing an image of a label of the second HVAC control as captured by a camera, or by the mobile device receiving the second identifier of the second HVAC control entered into the user interface, or by the second HVAC control wirelessly transmitting the second identifier of the second HVAC control to the mobile device.

14. The method of claim 11, wherein the method includes:
receiving one or more adjustments, via the user interface, to the one or more second settings for the second HVAC control; and
wirelessly transmitting the adjusted setting(s) from the mobile device to the second HVAC control for download to the memory of the second HVAC control for controlling at least one HVAC component according to the adjusted setting(s).

15. The method of claim 11, wherein:
the mobile device includes a Near Field Communication (NFC) short-range wireless communication interface;
the first HVAC control includes a Near Field Communication (NFC) short-range wireless communication interface;
the second HVAC control includes a Near Field Communication (NFC) short-range wireless communication interface; and
the method includes:
receiving and/or determining the first identifier of the first HVAC control by scanning, via the mobile device, a first NFC locator on the first HVAC control after placing the mobile device in contact with or close proximity to first NFC locator on the first HVAC control such that the NFC short-range wireless communication interface of the mobile device is in wireless communication with the NFC short-range wireless communication interface of the first HVAC control; and
wirelessly transmitting the one or more second settings for the second HVAC control from the memory of the mobile device to the second HVAC control after scanning, via the mobile device, a second NFC locator on the second HVAC control when the mobile device is placed in contact with or close proximity to the second NFC locator on the second HVAC control such that the NFC short-range wireless communication interface of the mobile device is in wireless communication with the NFC short-range wireless communication interface of the replacement HVAC control.

16. The method of claim 15, wherein the method includes:
allowing the user to search for and select, via the user interface, the second identifier of the second HVAC control before scanning the first NFC locator on the first HVAC control;
performing a compatibility check after scanning the first NFC locator on the first HVAC control to determine compatibility of the second HVAC control as a replacement for the first HVAC control; and
if the compatibility check fails, disallowing the wireless transmission of the one or more second settings from the memory of the mobile device to the second HVAC control and notifying the user of the failed compatibility check.

17. A mobile device configured to perform the method according to claim 11.

18. A non-transitory computer-readable storage media comprising computer-executable instructions, which when executed by at least one processor, cause the at least one processor to be operable for:
receiving and/or determining a first identifier of a first HVAC control;

automatically configuring one or more first settings for the first HVAC control corresponding with the first identifier, the one or more first settings stored within and retrievable directly from a memory of a mobile device;

displaying the one or more first settings on a user interface of the mobile device;

receiving a user entry, via the user interface, of at least a portion of the second identifier of the second HVAC control;

displaying, on the user interface, a list of possible HVAC controls that correspond with the at least a portion of the second identifier of the second HVAC control entered by the user;

allowing the user to select the second HVAC control from the list of possible HVAC controls displayed on the user interface;

automatically configuring one or more second settings for the second HVAC control corresponding with the second identifier, the one or more second settings stored within and retrievable directly from the memory of the mobile device;

displaying the one or more second settings on the user interface of the mobile device; and wirelessly transmitting the one or more second settings from the memory of the mobile device to the second HVAC control for download to a memory of the second HVAC control for controlling at least one HVAC component according to the one or more second settings;

wherein the computer-executable instructions include computer-executable instructions, which when executed by at least one processor, cause the at least one processor to be operable for retrieving the one or more first settings for the first HVAC control and the one or more second settings for the second HVAC control directly from the memory of the mobile device without retrieving the one or more first settings for the first HVAC control and the one or more second settings for the second HVAC control from a remote server or cloud.

19. The non-transitory computer-readable storage media of claim 18, wherein the computer-executable instructions include computer-executable instructions, which when executed by at least one processor, cause the at least one processor to be operable for displaying, on the user interface, a progressively shorter list of the possible HVAC controls for selection by the user as the user continues to enter more of the second identifier of the second HVAC control.

20. A mobile device comprising the non-transitory computer-readable storage media of claim 18.

* * * * *